United States Patent
Iwasaki

(10) Patent No.: US 9,491,433 B2
(45) Date of Patent: Nov. 8, 2016

(54) MOVING IMAGE DISTRIBUTION SERVER, MOVING IMAGE PLAYBACK APPARATUS, CONTROL METHOD, AND RECORDING MEDIUM

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

(*) Notice: Subject to any disclaimer, the term of this patent is extended or adjusted under 35 U.S.C. 154(b) by 0 days.

(21) Appl. No.: 14/619,540

(22) Filed: Feb. 11, 2015

(65) Prior Publication Data
US 2015/0156474 A1    Jun. 4, 2015

Related U.S. Application Data

(63) Continuation of application No. 13/938,612, filed on Jul. 10, 2013, now Pat. No. 8,988,501, which is a continuation of application No. PCT/JP2013/000957, filed on Feb. 20, 2013.

(30) Foreign Application Priority Data

Feb. 23, 2012   (JP) ................ 2012-037769
Apr. 25, 2012   (JP) ................ 2012-100328

(51) Int. Cl.
*H04N 13/00*    (2006.01)
*H04N 21/239*    (2011.01)
(Continued)

(52) U.S. Cl.
CPC ............ *H04N 13/0048* (2013.01); *G06T 9/00* (2013.01); *G06T 15/405* (2013.01);
(Continued)

(58) Field of Classification Search
None
See application file for complete search history.

(56) References Cited

U.S. PATENT DOCUMENTS

| | | | |
|---|---|---|---|
| 5,742,289 A | 4/1998 | Naylor et al. | |
| 6,167,088 A * | 12/2000 | Sethuraman | H04N 19/176 375/240.1 |

(Continued)

FOREIGN PATENT DOCUMENTS

| | | |
|---|---|---|
| EP | 1364535 | 11/2003 |
| EP | 1641278 | 3/2006 |

(Continued)

OTHER PUBLICATIONS

Wallach D S et al., "Accelerated MPEG Compression of Dynamic Polygonal Scenes", Computer Graphics Proceedings. Annual Conference Series. Siggraph, pp. 193-196 (Jul. 24, 1994).

(Continued)

*Primary Examiner* — Peter D Le
(74) *Attorney, Agent, or Firm* — Greenblum & Bernstein, P.L.C.

(57) ABSTRACT

A moving image distribution server sets an evaluation pixel for each of blocks that it divided a first screen into, and specifies a screen coordinate and a depth value, in a second screen acquired before the first screen, for a rendering object rendered on the evaluation pixel. It compares a depth value of the screen coordinate and a depth value of the rendering object rendered on the evaluation pixel, and determines that inter-frame coding will be performed with the second screen for a block for which the 2 depth values are considered to be the same. It transmits, to a external device, coding details information including the viewpoint information of the first screen, a depth buffer of the first screen, and information indicating whether or not blocks of the first screen are to be inter-frame coded.

6 Claims, 12 Drawing Sheets

(51) Int. Cl.
*H04N 21/472* (2011.01)
*H04N 21/6587* (2011.01)
*H04N 21/81* (2011.01)
*G06T 9/00* (2006.01)
*G06T 15/40* (2011.01)
*H04N 19/597* (2014.01)
*H04N 19/103* (2014.01)

(52) U.S. Cl.
CPC ..... *H04N 13/0022* (2013.01); *H04N 13/0059* (2013.01); *H04N 19/103* (2014.11); *H04N 19/597* (2014.11); *H04N 21/2393* (2013.01); *H04N 21/47202* (2013.01); *H04N 21/6587* (2013.01); *H04N 21/816* (2013.01); *G06T 2210/08* (2013.01)

(56) References Cited

U.S. PATENT DOCUMENTS

| | | | |
|---|---|---|---|
| 6,741,259 | B2 | 5/2004 | Baker et al. |
| 6,868,191 | B2 | 3/2005 | Nister |
| 6,975,329 | B2 | 12/2005 | Bastos et al. |
| 7,558,428 | B2 | 7/2009 | Shen et al. |
| 7,813,570 | B2 | 10/2010 | Shen et al. |
| 7,894,525 | B2 | 2/2011 | Piehl et al. |
| 8,154,553 | B2 | 4/2012 | Peterfreund |
| 8,264,493 | B2 | 9/2012 | Peterfreund |
| 8,447,141 | B2 | 5/2013 | Barenbrug |
| 8,599,403 | B2 | 12/2013 | Redert et al. |
| 2002/0032905 | A1 | 3/2002 | Sherr et al. |
| 2002/0049679 | A1 | 4/2002 | Russell et al. |
| 2002/0069420 | A1 | 6/2002 | Russell et al. |
| 2002/0073033 | A1 | 6/2002 | Sherr et al. |
| 2002/0154157 | A1 | 10/2002 | Sherr et al. |
| 2004/0012600 | A1 | 1/2004 | Deering et al. |
| 2004/0095999 | A1 | 5/2004 | Piehl et al. |
| 2005/0057571 | A1 | 3/2005 | Stevens |
| 2005/0237323 | A1 | 10/2005 | Shimamura et al. |
| 2006/0053066 | A1 | 3/2006 | Sherr et al. |
| 2006/0056513 | A1 | 3/2006 | Shen et al. |
| 2006/0056708 | A1 | 3/2006 | Shen et al. |
| 2009/0027383 | A1 | 1/2009 | Bakalash et al. |
| 2009/0103616 | A1* | 4/2009 | Ho ............ G06T 1/00 375/240.12 |
| 2009/0128551 | A1 | 5/2009 | Bakalash et al. |
| 2009/0278842 | A1 | 11/2009 | Peterfreund |
| 2009/0289945 | A1 | 11/2009 | Peterfreund |
| 2010/0302078 | A1 | 12/2010 | Schuessler |
| 2011/0069139 | A1 | 3/2011 | Liu |
| 2011/0216833 | A1 | 9/2011 | Chen et al. |
| 2012/0229602 | A1 | 9/2012 | Chen et al. |
| 2012/0299938 | A1 | 11/2012 | Iwasaki |
| 2013/0017889 | A1 | 1/2013 | Kozlov |
| 2013/0101017 | A1 | 4/2013 | De Vleeschauwer et al. |
| 2013/0106841 | A1 | 5/2013 | Ko |
| 2013/0235933 | A1 | 9/2013 | Sasai et al. |
| 2014/0009574 | A1 | 1/2014 | Hannuksela et al. |
| 2014/0064368 | A1 | 3/2014 | Minezawa et al. |
| 2014/0168362 | A1 | 6/2014 | Hannuksela et al. |
| 2014/0341292 | A1 | 11/2014 | Schwarz et al. |

FOREIGN PATENT DOCUMENTS

| | | |
|---|---|---|
| EP | 2384001 | 11/2011 |
| EP | 2674916 | 12/2013 |
| JP | 07-327231 | 12/1995 |
| JP | 08-305895 | 11/1996 |
| JP | 3287977 | 6/2002 |
| JP | 2002-369205 | 12/2002 |
| JP | 2003-532178 | 10/2003 |
| JP | 2004-517590 | 6/2004 |
| JP | 2006-094494 | 4/2006 |
| JP | 2007-184969 | 7/2007 |
| JP | 2007-251543 | 9/2007 |
| JP | 4004408 | 11/2007 |
| JP | 2008-048178 | 2/2008 |
| JP | 2008-252651 | 10/2008 |
| JP | 2013-041568 | 2/2013 |
| TW | 201230818 | 7/2012 |
| TW | 201313032 | 3/2013 |
| TW | 201320716 | 5/2013 |
| WO | 01/77783 | 10/2001 |
| WO | 02/060183 | 8/2002 |
| WO | 2009/138878 | 11/2009 |
| WO | 2011/071615 | 6/2011 |
| WO | 2013/024640 | 2/2013 |

OTHER PUBLICATIONS

Arto Laikari et al., "Accelerated video streaming for gaming architecture", 3DTV-Conference: The True Vision-Capture, Transmission and Display of 3D Video (3DTV-CON), 2010, IEEE, Piscataway, NJ, USA, pp. 1-4 (Jun. 7, 2010).

Dawid Pajak et al., "Scalable Remote Rendering with Depth and Motion-flow Augmented Streaming", Computer Graphics Forum, vol. 30, No. 2, pp. 415-424 (Apr. 28, 2011).

Liang Cheng et al., "Real-time 3d Graphics Streaming Using MPEG-4", Proceedings of the IEEE/ACM Workshop on Broadband Wireless Services and Applications, ICS-UCI, pp. 1-16 (Jul. 18, 2004).

U.S. Appl. No. 13/817,171 to Tetsuji Iwasaki, which was filed Feb. 15, 2013.

International Search Report and Written Opinion in International Application No. PCT/JP2013/000957, dated Mar. 19, 2013.

International Application No. PCT/JP2013/002340, not yet published.

Extended European Search Report from European Patent Office (EPO) in European Patent Application No. 13752570.5, dated Aug. 18, 2014.

Ismael Daribo et al., "Motion Vector Sharing and Bitrate Allocation for 3D Video-Plus-Depth Coding", Eurasip Journal on Advances in Signal Processing, vol. 2009, No. 1, pp. 1-13 (Jun. 4, 2008).

Yu-Cheng Fan et al., "Three-Dimensional Depth Map Motion Estimation and Compensation for 3D Video Compression", IEEE Transactions on Magnetics, IEEE Service Center, New York, NY, US, vol. 47, No. 3, pp. 691-695 (Mar. 1, 2011).

Daniel Cohen-Or, "Model-Based View—Extrapolation for Interactive VR Web-Systems", Computer Graphics International, 1997. Proceedings Hasselet and Diepenbeek, Belgium Jun. 23-27, 1997, Los Alamitos, CA, USA, IEEE Comput. SOC, US, pp. 104-112 and 248 (Jun. 23, 1997).

Extended European Search Report (EESR) issued by European Patent Office (EPO) in European Patent Application No. 13733944.6, dated May 25, 2016.

* cited by examiner

F I G. 3
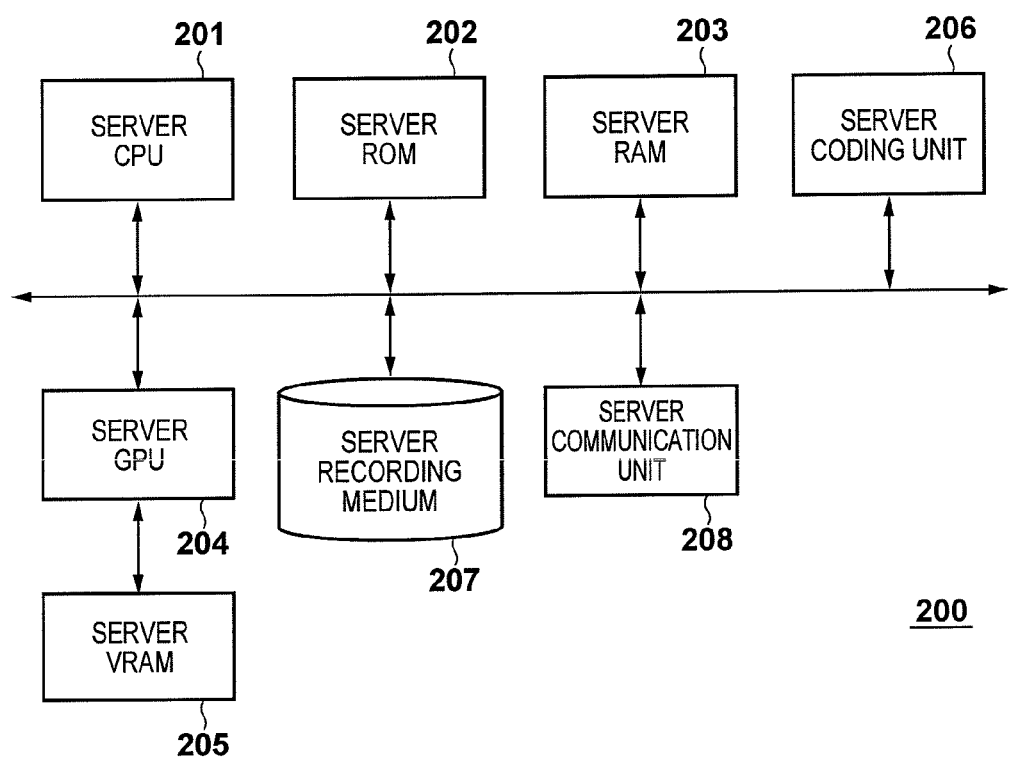

F I G. 8
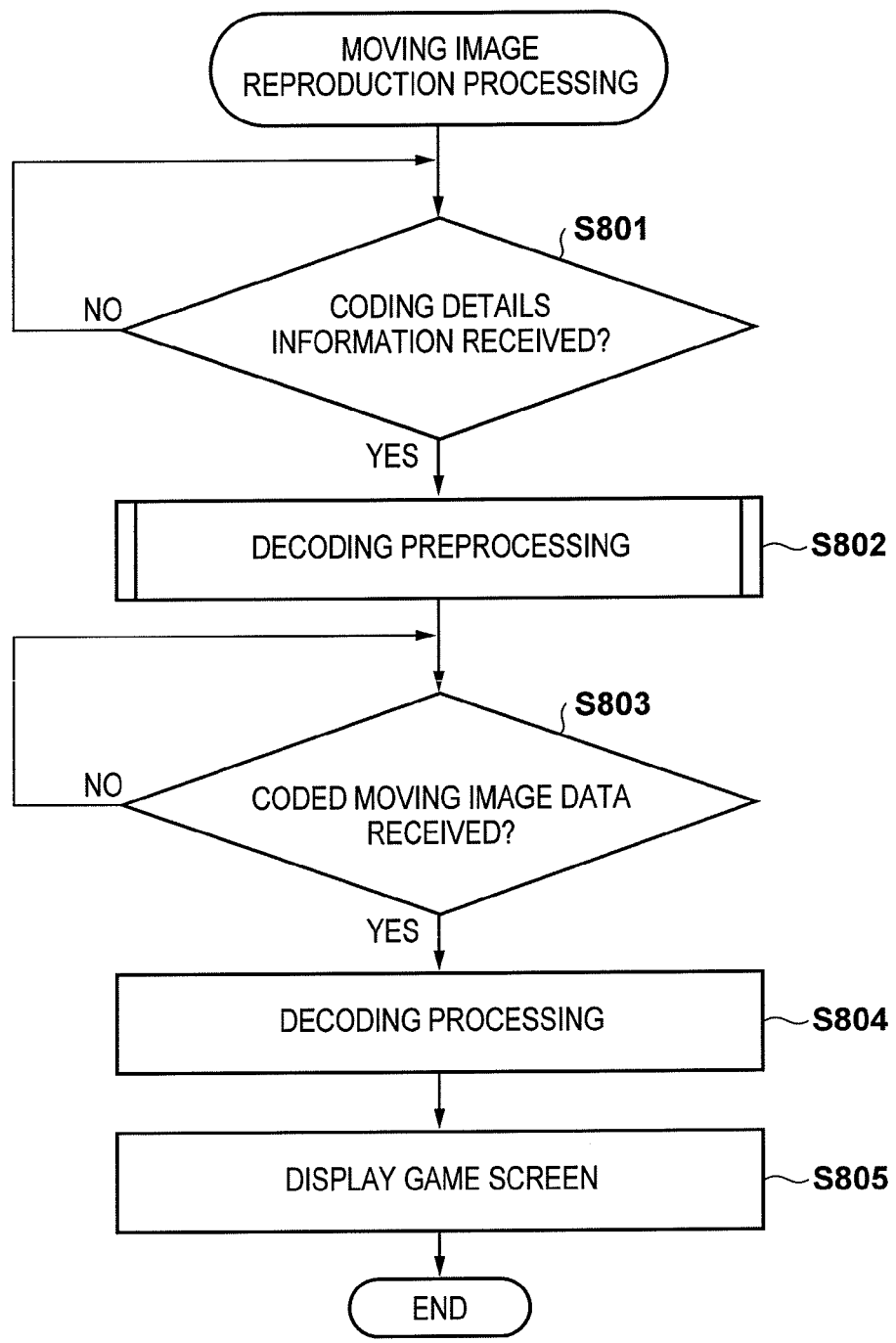

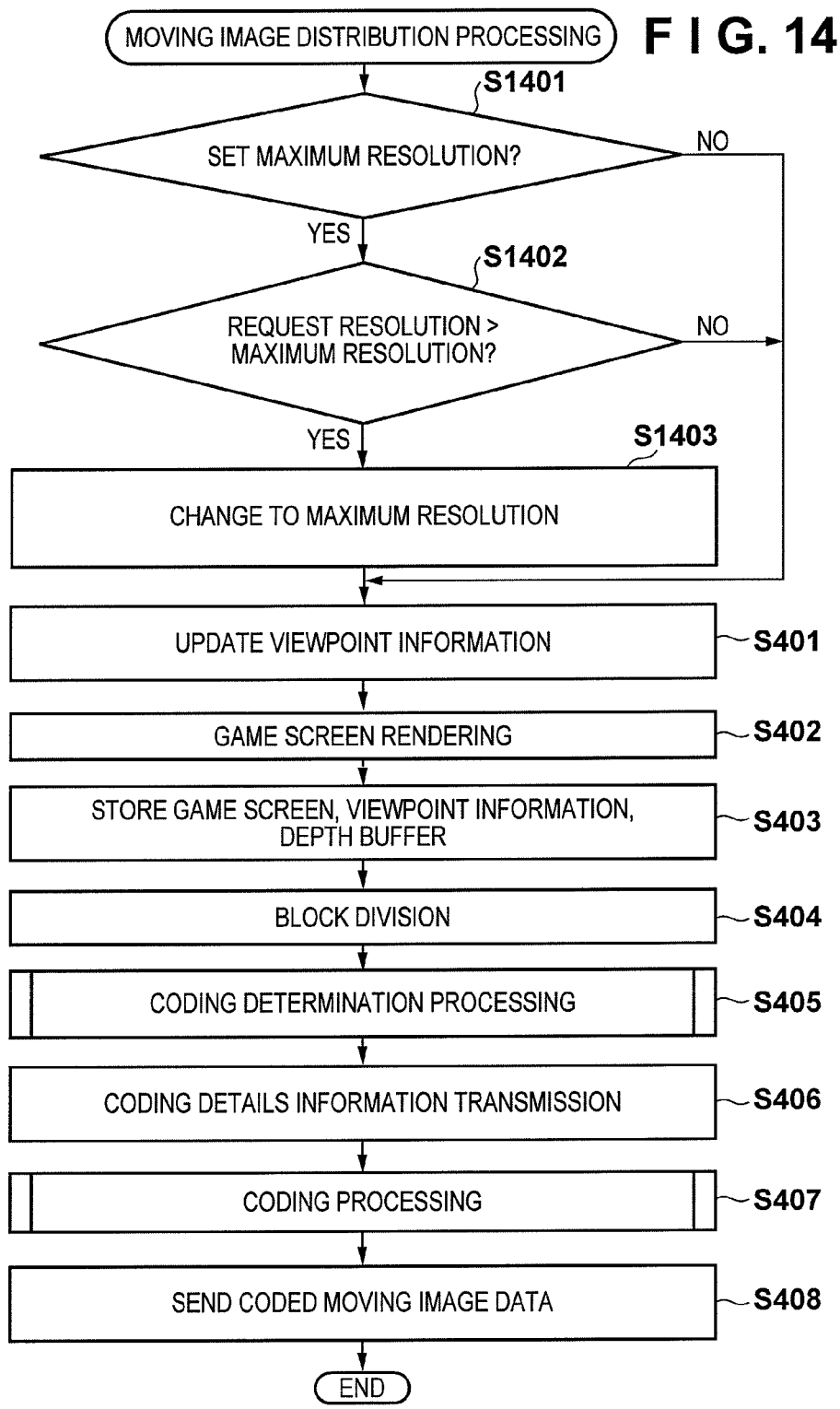

MOVING IMAGE DISTRIBUTION SERVER, MOVING IMAGE PLAYBACK APPARATUS, CONTROL METHOD, AND RECORDING MEDIUM

CROSS-REFERENCE TO RELATED APPLICATION

This application is a continuation application of U.S. patent application Ser. No. 13/938,612, filed Jul. 10, 2013, which is a continuation of International Application No. PCT/JP2013/000957, filed on Feb. 20, 2013, which claims priority to Japanese Application No. 2012-037769 filed on Feb. 23, 2012, and Japanese Application No. 2012-100328 filed on Apr. 25, 2012. The disclosure of each of the above-identified applications, including the specification, drawings, and claims, is incorporated herein by reference in its entirety.

BACKGROUND OF THE INVENTION

1. Field of the Invention

The present invention relates to a moving image distribution server, a moving image playback apparatus, a control method, and a recording medium and, more particularly, to a coded moving image data streaming distribution technique.

2. Description of the Related Art

Client devices such as personal computers (PCs) capable of network connection have become widespread. Along with the widespread use of the devices, the network population of the Internet is increasing. Various services using the Internet have recently been developed for the network users, and there are also provided entertainment services such as games.

One of the services for the network users is a multiuser online network game such as MMORPG (Massively Multiplayer Online Role-Playing Game). In the multiuser online network game, a user connects his/her client device in use to a server that provides the game, thereby doing match-up play or team play with another user who uses another client device connected to the server.

In a general multiuser online network game, each client device sends/receives data necessary for game rendering to/from the server. The client device executes rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to execute rendering processing require a user to use a PC having sufficient rendering performance or a dedicated game machine. For this reason, the number of users of a network game (one content) depends on the performance of the client device required by the content. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability such as rendering performance of a client device. In a game as described in PTL1, a server acquires the information of an operation caused in a client device and provides, to the client device, a game screen obtained by executing rendering processing using the information.

CITATION LIST

Patent Literature

PTL1: International Publication No. 2009/138878

SUMMARY OF THE INVENTION

In the above-described game of PTL1, the game screen provided by the server to the client device is provided in the form of coded moving image data to reduce the information amount to be sent. A general moving image coding type such as an MPEG standard performs intra coding (intra-frame coding) without motion compensation for each block obtained by dividing one frame image or inter coding (inter-frame coding) with motion compensation by inter-frame prediction, although this changes depending on the adopted coding type. For each coding type, an object of high compression efficiency exists. In general, blocks (iblock and pblock) are generated by performing intra coding and inter coding for each block, and a block of high compression efficiency is included in coded data.

In intra coding, DCT, run-length coding, and the like are applied to an unprocessed block image of compression target, thereby compressing the image. On the other hand, in inter coding, the difference image between a block image of compression target and a reference image extracted from the preceding frame image in correspondence with the block is generated. Then, DCT, run-length coding, and the like are applied to the image to compress it. For this reason, inter coding includes processing of specifying, in the preceding frame image, a region having the highest correlation to the compression target block image. In the processing associated with detection of the region having the highest correlation, analysis is performed by calculating the similarity and distance to the compression target block image while moving the evaluation region in the preceding frame image. Hence, this analysis processing may take time.

Especially in, for example, a game that changes the rendered contents interactively based on user input, real-time rendering, that is, high-speed response to input is needed, and the time required for moving image coding processing is limited. In this case, it is necessary to quickly perform coding processing of each block and processing of determining whether to perform intra coding or inter coding. However, no detailed method of quickly and efficiently performing moving image coding of a rendered screen has been disclosed yet.

The present invention has been made in consideration of the above-described problems of the prior art, and provides a moving image distribution server for quickly and efficiently performing moving image coding of a screen obtained by rendering processing, a moving image playback apparatus, a control method, and a recording medium.

The present invention in its first aspects provides a moving image distribution server comprising: an acquisition unit configured to acquire, in series, a rendered screen, viewpoint information used for rendering the screen, and a depth buffer corresponding to the screen; a division unit configured to divide a first screen acquired by the acquisition unit into a plurality of blocks; a setting unit configured to set an evaluation pixel for each block the division unit divided the first screen into; a specifying unit configured to specify a screen coordinate and a depth value, in a second screen acquired before the first screen, for a rendering object rendered on the evaluation pixel set by the setting unit; a determination unit configured to compare a depth value of the screen coordinate and the depth value of a rendering object rendered on the evaluation pixel specified by the specifying unit in a depth buffer corresponding to the second screen, and determine whether or not to consider the two depth values to be the same; a coding unit configured to perform inter-frame coding with the second screen for a block for which the two depth values were considered by the determination unit to be the same and perform intraframe coding for a block for which the two depth values were not considered by the determination unit to be the same; and a transmission unit configured to transmit to an external device coding details information including viewpoint information used for rendering the first screen, a depth buffer corresponding to the first screen, and information, for each block of the first screen, indicating whether or not inter-frame coding was performed by the coding unit for each block of the first screen, wherein the transmission unit transmits the coding details information to the external device before a generation of coding data of a block of the first screen, which was coded by the coding unit, completes.

The present invention in its second aspect provides a moving image playback apparatus that acquires, in series, from a moving image distribution server, decodes, and plays back coded moving image data in which a screen of a frame is coded, comprising: a first receiving unit configured to receive, from the moving image distribution server, coding details information including viewpoint information used for rendering a first screen coded in first coded moving image data, a depth buffer corresponding to the first screen, and information, for each block of the first screen, indicating whether or not inter-frame coding is performed; a decoding pre-processing unit configured to generate, based on the coding details information received by the first receiving unit, reference data to be used for decoding the first coded moving image data from a second screen acquired by decoding second coded moving image data acquired before the first coded moving image data; a second receiving unit configured to receive the first coded moving image data from the moving image distribution server; a decoding unit configured to decode and play back the first coded moving image data received by the second receiving unit using the reference data generated by the decoding pre-processing unit.

By the present invention having this kind of configuration, it is possible to quickly and efficiently perform moving image coding of screens acquired by rendering processing.

Other characteristics and advantages of the present invention will become clear from the following explanation with reference to the attached drawings. Note, in the attached drawings common reference numerals are given to similar configurations.

BRIEF DESCRIPTION OF THE DRAWINGS

The attached drawings are included in the specification, compose a part of them, show arrangement and embodiments of the present invention, and are used for explaining principles of the present invention with their description.

FIG. 3 is a block diagram showing the functional arrangement of a moving image distribution server 200 according to the embodiment of the present invention.

FIG. 8 is a flowchart illustrating moving image reproduction processing of the PC 100 according to the embodiment of the present invention.

FIG. 14 is a flowchart illustrating moving image distribution processing of the moving image distribution server 200 according to the second embodiment of the present invention.

DESCRIPTION OF THE EMBODIMENTS

First Embodiment

An exemplary embodiment of the present invention will now be described in detail with reference to the accompanying drawings. Note that in the following embodiment, an example of a moving image distribution system will be explained in which the present invention is applied to a PC 100 serving as a moving image playback apparatus and a moving image distribution server 200.

<Arrangement of Moving Image Distribution System>

Figure 1:
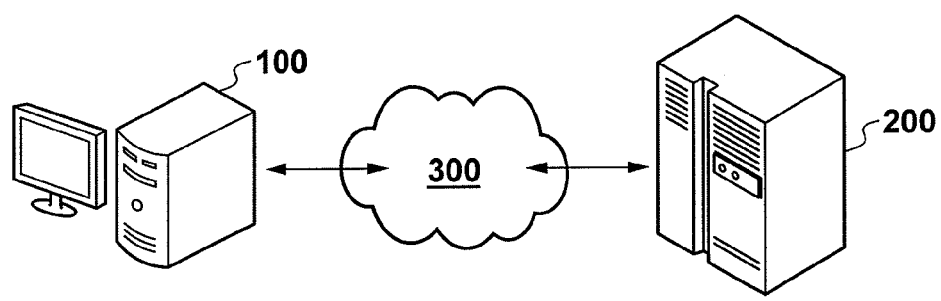
FIG. 1 is a view showing the system arrangement of a moving image distribution system according to the first embodiment of the present invention.

FIG. 1 is a view showing the system arrangement of a moving image distribution system according to the embodiment of the present invention.

As shown in FIG. 1, the PC 100 and the moving image distribution server 200 are connected via a network 300 such as the Internet. In this embodiment, the PC 100 receives, as coded moving image data, a game screen of a game content executed in the moving image distribution server 200 as an example of a moving image distribution content. In this embodiment, the moving image distribution server 200 receives an operation (user input) caused in the PC 100 and renders a game screen corresponding to the operation on the frame basis. The moving image distribution server 200 then codes the rendered game screen and distributes the obtained coded moving image data to the PC 100. Upon receiving the coded moving image data from the moving image distribution server 200, the PC 100 decodes and reproduces the coded moving image data, thereby providing the game screen to the user.

In this embodiment, a content that provides a game screen rendered by a game program executed in the moving image distribution server 200 on the network 300 will be described as an example of a moving image distribution content. However, the practice of the present invention is not limited to this. The moving image distribution server 200 need only be configured to perform rendering processing to render one frame of a moving image distribution content to be provided to the distribution destination and distribute coded moving image data obtained by coding processing performed for each frame. Rendering of a screen of one frame need not always be executed in the moving image distribution server 200 and may be executed by, for example, an external rendering server. In other words, the moving image distribution server 200 may receive a screen for 1 frame, viewpoint information used for rendering the screen (camera parameters), and a depth buffer corresponding to the screen, and execute coding processing described later.

In this embodiment, the PC 100 will be described as a client device connected to the moving image distribution server 200. However, the practice of the present invention is not limited to this. The client device connected to the moving image distribution server 200 can be any other device capable of decoding and reproducing coded moving image data received from the moving image distribution server 200, for example, a consumer game machine, a portable game machine, a cellular phone, a PDA, or a tablet.

<Arrangement of PC 100>

Figure 2:
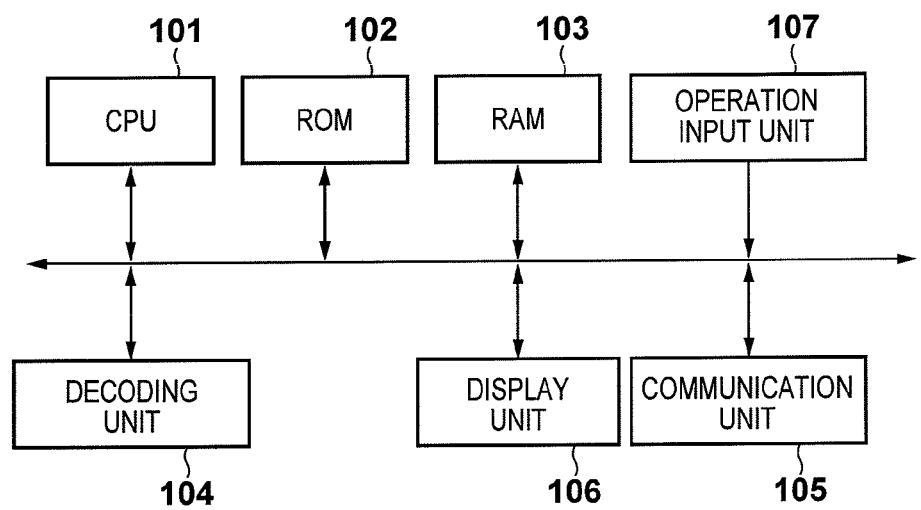
FIG. 2 is a block diagram showing the functional arrangement of a PC 100 according to the embodiment of the present invention.

FIG. 2 is a block diagram showing the functional arrangement of the PC 100 according to the embodiment of the present invention.

A CPU 101 controls the operation of each block of the PC 100. More specifically, the CPU 101 controls the operation of each block by reading out an operation program of moving image reproduction processing recorded in, for example, a ROM 102 or a recording medium, and extracting and executing the program on a RAM 103.

The ROM 102 is, for example, a rewritable nonvolatile memory. The ROM 102 stores the information of constants and the like necessary for the operation of each block of the PC 100 in addition to operation programs of moving image reproduction processing and the like.

The RAM 103 is a volatile memory. The RAM 103 serves as not only an operation program extraction area but also a storage area for temporarily storing intermediate data and the like output in the operation of each block of the PC 100.

A decoding unit 104 performs decoding processing of coded moving image data received by a communication unit 105 to be described later so as to generate a game screen of one frame. Before the decoding processing of coded moving image data, the decoding unit 104 performs decoding preprocessing of preparing reference data to be used in the decoding processing. The decoding preprocessing and decoding processing executed by the decoding unit 104 will be explained in detail concerning moving image reproduction processing to be described later.

The communication unit 105 is a communication interface provided in the PC 100. The communication unit 105 sends/receives data to/from another device such as the moving image distribution server 200 connected via the network 300. At the time of data sending, the communication unit 105 converts data into a data transmission format predetermined for the network 300 or the device of the sending destination and sends the data to the device of the sending destination. At the time of data reception, the communication unit 105 converts the data received via the network 300 into an arbitrary data format readable by the PC 100 and stores the data in, for example, the RAM 103.

In this embodiment, the description will be made assuming that the PC 100 and the moving image distribution server 200 are connected via the network 300. However, the PC 100 and the moving image distribution server 200 may, for example, directly be connected using a cable, as can easily be understood.

A display unit 106 is a display device such as an LCD monitor connected to the PC 100. The display unit 106 performs display control to display a received game screen in a display region. Note that the display unit 106 can be either a display device incorporated in the PC 100 such as a laptop PC or a display device externally connected to the PC 100 using a cable.

An operation input unit 107 is a user interface such as a mouse, a keyboard, or a game pad provided on the PC 100. Upon detecting that an operation of the user interface has been caused, the operation input unit 107 outputs a control signal corresponding to the operation to the CPU 101.

<Arrangement of Moving Image Distribution Server 200>

FIG. 3 is a block diagram showing the functional arrangement of the moving image distribution server 200 according to the embodiment of the present invention.

A server CPU 201 controls the operation of each block of the moving image distribution server 200. More specifically, the server CPU 201 controls the operation of each block by reading out an operation program of moving image distribution processing recorded in, for example, a server ROM 202, and extracting and executing the program on a server RAM 203.

The server ROM 202 is, for example, a rewritable nonvolatile memory. The server ROM 202 stores the information of constants and the like necessary for the operation of each block of the moving image distribution server 200 in addition to operation programs of moving image distribution processing and the like.

The server RAM 203 is a volatile memory. The server RAM 203 serves as not only an operation program extraction area but also a storage area for temporarily storing intermediate data and the like output in the operation of each block of the moving image distribution server 200.

A server GPU 204 generates a game screen to be displayed on the display unit 106 of the PC 100. A server VRAM 205 is connected to the server GPU 204. Upon receiving a rendering instruction and the information (viewpoint information) of the position and direction of a camera to be used for rendering of a game screen from the server CPU 201, the server GPU 204 reads out a rendering object concerning the rendering instruction from, for example, a server recording medium 207 to be described later and stores it in a GPU memory. When rendering on the connected server VRAM 205, the server GPU 204 extracts the rendering object to the cache memory and then writes the extracted rendering object in the server VRAM 205.

A server coding unit 206 performs coding processing of the game screen generated on the server VRAM 205 by the server GPU 204. The server coding unit 206 divides the game screen of the coding target into blocks and performs intra coding (intra-frame coding) or inter coding (inter-frame coding) of each block. Details of the coding processing will be described later. In this embodiment, the server coding unit 206 performs DCT (Discrete Cosine Transform) of each block for each color channel of YCbCr and then compresses each block by run-length coding.

The server recording medium 207 is a recording device such as an HDD removably connected to the moving image distribution server 200. In this embodiment, the server recording medium 207 is assumed to record the model data of each rendering object, the information of a light source, and the like, which are used in generating screen of rendering processing.

A server communication unit 208 is a communication interface provided in the moving image distribution server 200. In this embodiment, the server communication unit 208 sends/receives data to/from another device such as the PC 100 connected via the network 300. Note that the server communication unit 208 performs data format conversion based on the communication specification, like the communication unit 105.

<Moving Image Distribution Processing>

Figure 4:
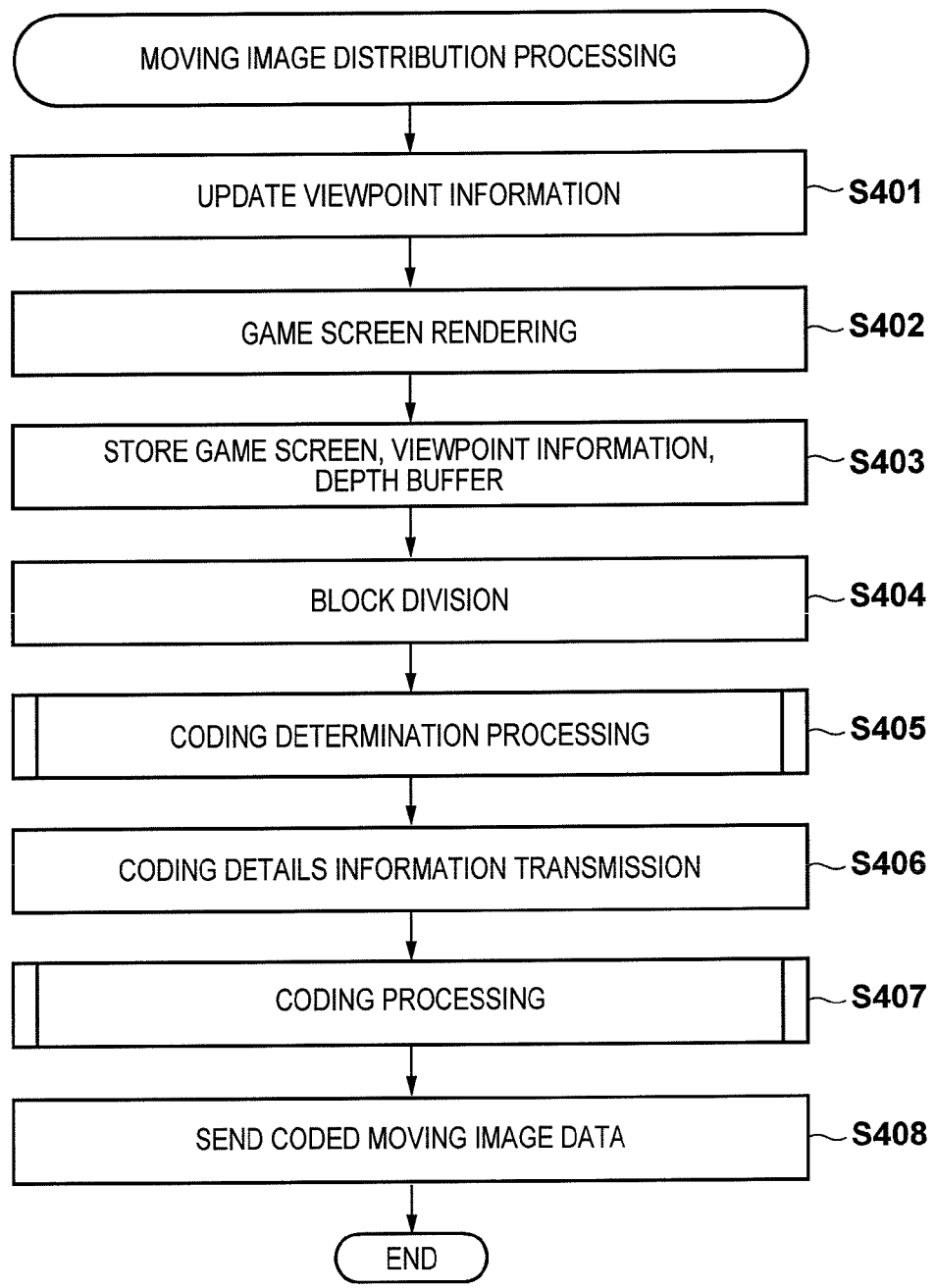
FIG. 4 is a flowchart illustrating moving image distribution processing of the moving image distribution server 200 according to the first embodiment of the present invention.

Detailed moving image distribution processing to be executed by the moving image distribution server 200 of the moving image distribution system according to the embodiment having the above-described arrangement will be described with reference to the flowchart of FIG. 4. Processing corresponding to the flowchart can be implemented by causing the server CPU 201 to read out a corresponding processing program recorded in, for example, the server ROM 202 and extract and execute it on the server RAM 203. Note that the description will be made assuming that the moving image distribution processing is started when the server CPU 201 detects that a distribution request for a game content provided by the moving image distribution server 200 has been received from the PC 100, and repetitively executed for each frame of the game.

Note that in this embodiment, the description will be made assuming that the moving image distribution server 200 provides, to the PC 100, a game screen generated by rendering a three-dimensional scene in a form of coded moving image data. However, the content to be distributed by the moving image distribution server 200 is not limited to this, as described above, and can be any arbitrary content for providing a screen obtained by rendering a three-dimensional scene. Also, for simplicity, the rendering objects included in the rendered game screens will be explained as static objects none of which move.

In step S401, the server CPU 201 updates the viewpoint information of a game screen to be rendered next. More specifically, the server CPU 201 updates the viewpoint information of a game screen to be rendered next by, for example, referring to the information of an operation input concerning the game caused by the user on the PC 100, which is received by the server communication unit 208. The user operation that may cause update of the viewpoint information corresponds to, for example, a viewpoint position/direction change operation or movement of a character that is the operation target of the user. Note that the viewpoint information to be used for rendering the game screen may be changed not only by a user operation caused on the PC 100 but also in accordance with, for example, the progress of the game.

In step S402, the server CPU 201 causes the server GPU 204 to render the game screen corresponding to the viewpoint information updated in step S401. Specifically, the server CPU 201 specifies a rendering object included in the rendered game screen and determines a rendering order of the rendering object. Next, the server CPU 201, in accordance with the rendering order, transmits a rendering command for the rendering object to the server GPU 204. Also, the server CPU 201 reads out model data (or vertex data and connection data) of the rendering object that it causes the server GPU 204 to render, texture data, and position and rotation information for the rendering object parameters from the server recording medium 207 and transfers them to the server GPU 204. The server GPU 204 stores information for the transferred rendering object into GPU memory.

The server GPU 204 causes model data stored in the GPU memory to move and rotate in accordance with the position and rotation information parameters for the rendering object for which the rendering command was received. Next, the server GPU 204, renders to frame buffer of the server VRAM 205 after applying texture and light effects to the rendering object.

Note, occlusion due to the in anteroposterior relationship of rendering objects is considered at a pixel level in the rendering of a screen. Specifically, in a case where, for a specific pixel, rendering of another rendering object positioned in front of the target rendering object on the viewing point side was performed, the rendering of the rendering object pixel of the target rendering object is omitted.

The anteroposterior relationship of the rendering objects is determined by referencing a depth buffer (also referred to as z-buffer, depth map, etc.). The depth buffer is a 2 dimensional image stored in the server VRAM 205 wherein the pixel value of each pixel indicates a distance between a rendering object that has been rendered on the pixel and the viewpoint (camera) (z value: depth value). The server GPU 204 specifies a pixel of the target rendering object to be rendered, references the depth value, and compares the depth value with the depth value of the pixel of the rendering object when rendering each rendering object included in the screen according the rendering order. In a case where the depth value of the target rendering object that is being rendered is smaller, this indicates that the target rendering object is arranged in front, and so the server GPU 204 renders the corresponding pixel of the target rendering object in the server VRAM 205. At this time, the server GPU 204 updates the depth buffer by updating the depth value in the depth buffer of the corresponding pixel with the depth value of the target rendering object.

When this kind of rendering completes for all of the rendering objects, the depth buffer corresponding to a game screen rendered in the server VRAM 205 is complete.

In step S403, the server CPU 201 stores viewpoint information used in rendering the game screen and the depth buffer corresponding to the game screen into the server RAM 203. The moving image distribution server 200 of the present embodiment, for each frame of the coded moving image data to be provided to the PC 100, stores the rendered game screen, viewpoint information used in the rendering of the game screen and the depth buffer corresponding to the game screen in the server RAM 203, and maintains these at least until the coding processing of the next frame completes. This information is used not only for the creation of coded moving image data of the current frame but also for coding processing for the next frame and for the coding determination processing explained later.

In step S404, the server CPU 201, after performing color conversion of the rendered game screen to the YCbCr color space, and divides the game screen into blocks of a predetermined pixel size (for example 16 pixels×16 pixels).

In step S405, the server CPU 201 executes coding determination processing and determines whether to perform intraframe coding or inter-frame coding for each frame.

<Coding Determination Processing>

Figure 5:
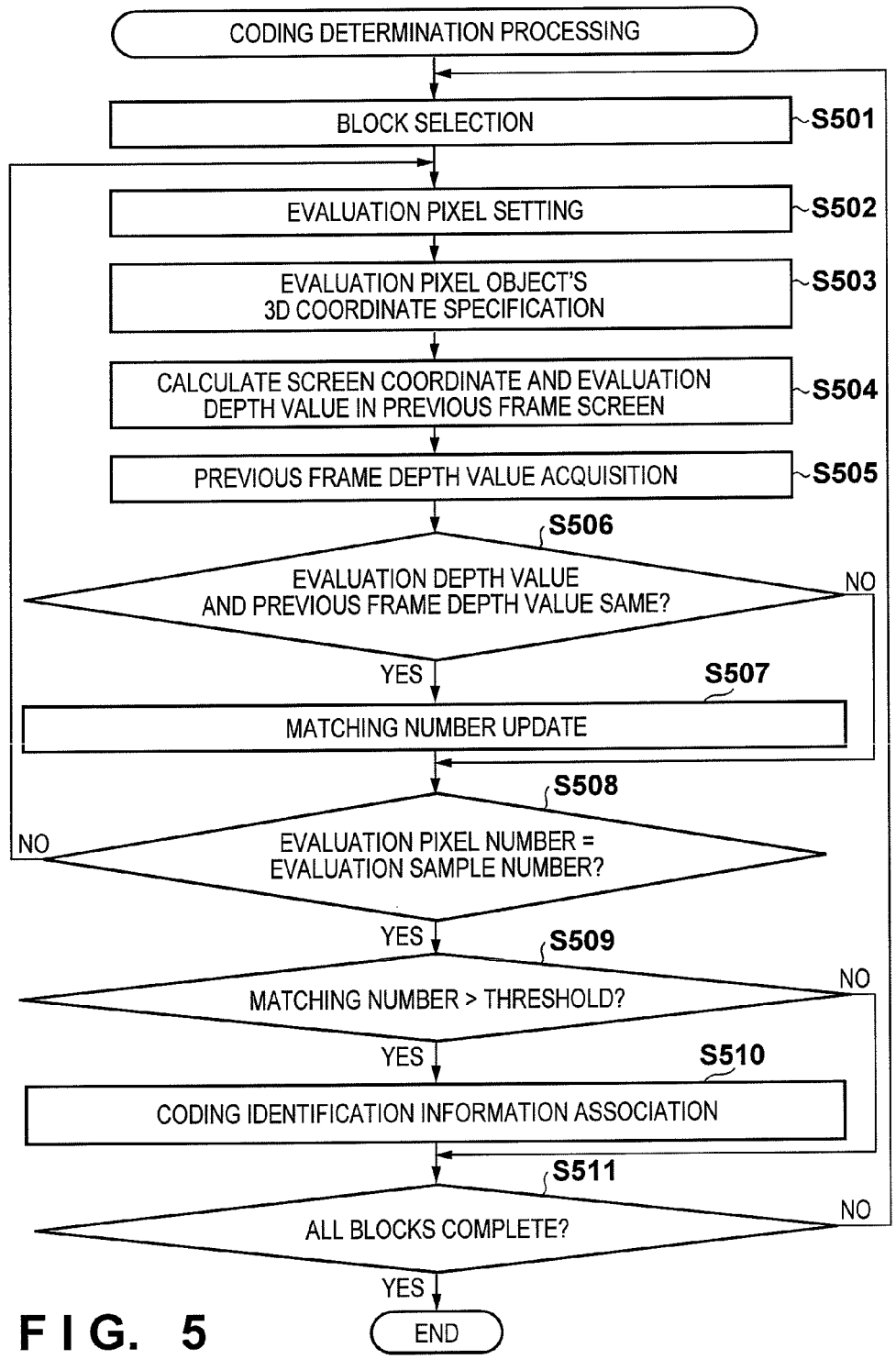
FIG. 5 is a flowchart illustrating coding determination processing of the moving image distribution server 200 according to the embodiment of the present invention.

The details of coding determination processing executed by the moving image distribution server 200 of the present invention will be explained with reference to the flowchart of FIG. 5.

In step S501, the server CPU 201 selects a block for which the coding method has not been determined out of the blocks of the rendered game screen (target game screen).

In step S502, the server CPU 201 sets one pixel out of the pixels in the selected block, as an evaluation pixel. Note, the server CPU 201 stores in the server RAM 203 a screen coordinate ($S_{current}$) in the target game screen for the set evaluation pixel.

In step S503, the server CPU 201 specifies a 3 dimensional coordinate ($D_{current}$) of a rendering object (evaluation pixel object) that was rendered to be the set evaluation pixel. Specifically, the server CPU 201 first acquires the depth value ($z_{current}$) for the screen coordinate $S_{current}$ of the evaluation pixel from the depth buffer corresponding to the target game screen. Then the server CPU 201 determines the direction to the evaluation pixel object from the viewpoint information used in rendering the target game screen and the screen coordinate $S_{current}$. Next, the server CPU 201 determines the 3 dimensional coordinate $D_{current}$ of the evaluation pixel object from the direction the viewpoint information, the direction to the specified evaluation pixel object, and the depth value $z_{current}$ of the evaluation pixel.

In step S504, the server CPU 201 calculates the screen coordinate of the evaluation pixel ($S_{previous}$) and the depth value (evaluation depth value $z_{estimate}$) of a game screen (preceding frame screen) rendered in the frame immediately before the current frame. Specifically, the server CPU 201 reads out viewpoint information used in rendering the preceding frame screen stored in the server RAM 203, and changes the 3 dimensional coordinate $D_{current}$ of the evaluation pixel object to the screen coordinate $S_{previous}$ in the preceding frame screen. Also, the server CPU 201 calculates the viewpoint position included in the viewpoint information used in rendering the preceding screen, and the depth value $z_{estimate}$ which is the distance to the 3 dimensional coordinate $D_{current}$ of the evaluation pixel object.

In step S505, the server CPU 201 reads out the depth buffer corresponding to the preceding frame from the server RAM 203 and acquires the depth value for the screen coordinate $S_{previous}$ (preceding frame depth value $z_{previous}$).

In step S506, the server CPU 201 determines whether or not the evaluation depth value $z_{estimate}$ of the evaluation pixel object and the preceding frame depth value $z_{previous}$ are considered to be the same. Specifically, the server CPU 201 determines whether or not the absolute value of the difference between the evaluation depth value $z_{estimate}$ and the preceding frame depth value $z_{previous}$ is within a threshold at which they are considered to be the same. In this step, the server CPU 201 determines whether or not the evaluation pixel object is occluded in the game screen of the preceding frame.

Figure 6:
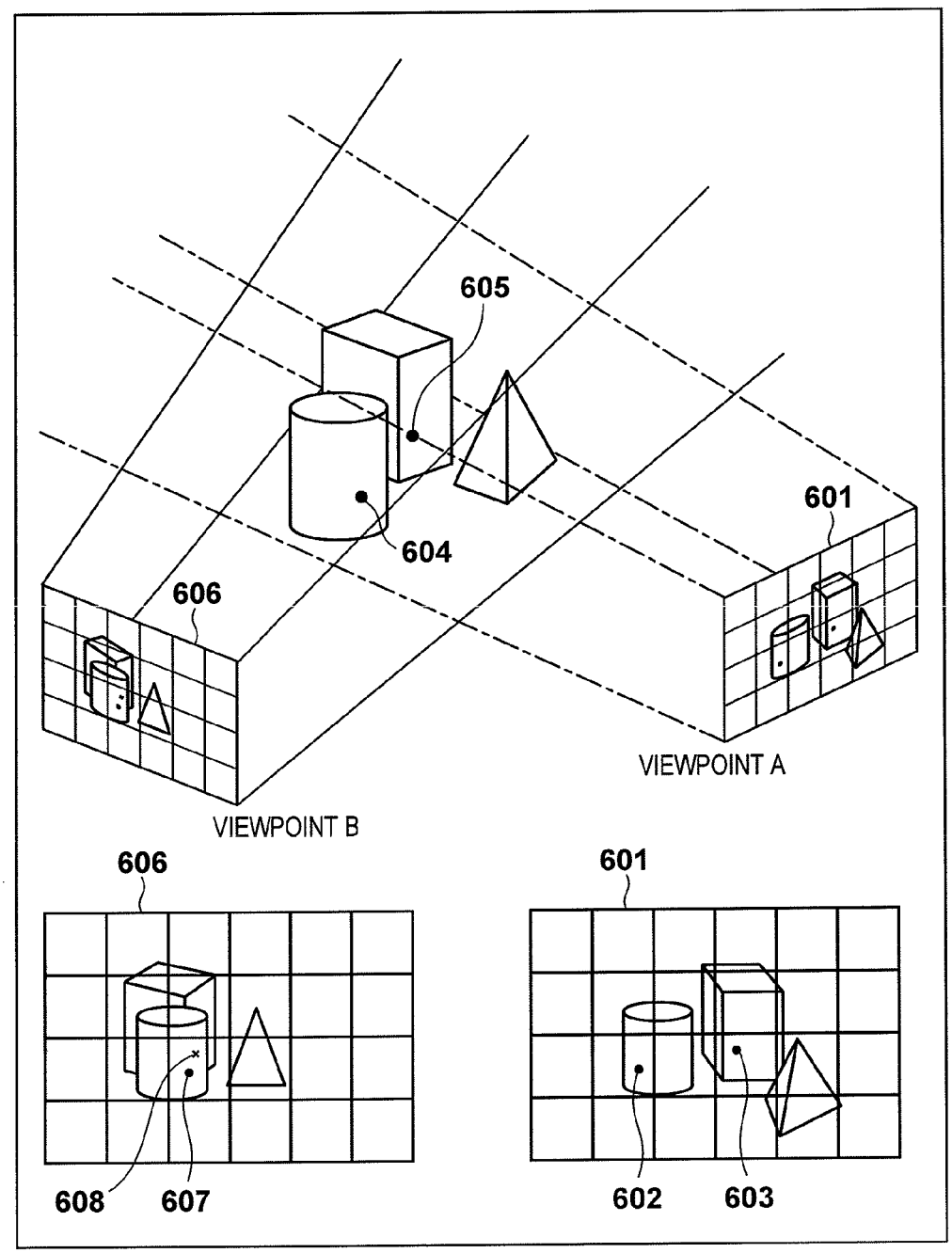
FIG. 6 is a view for explaining a method of comparing an evaluation depth value and a depth value of a previous frame.

For example, as with FIG. 6, evaluation pixels 602 and 603 in a game screen 601 (target game screen) of the current frame rendered for a viewpoint A. The evaluation pixel object 604 corresponding the evaluation pixel 602 rendered in the position of target pixel 607 in a game screen 606 (preceding frame screen) of the preceding screen for a viewpoint B. At this point, because the evaluation pixel object 604 is not occluded in the preceding frame screen, the evaluation depth value $z_{estimate}$ and the preceding frame depth value $z_{previous}$ match. On the other hand, the evaluation pixel object 605 corresponding to the evaluation pixel 603 is rendered a the position of corresponding pixel 608 in the preceding frame screen 606. However, at this point, because the evaluation pixel object 605 is occluded in the preceding frame screen 606, the evaluation depth value $z_{estimate}$ and the preceding frame depth value $z_{previous}$ are different.

By using depth buffers and viewpoint information of the preceding frame and the current frame in the coding determination processing of the present embodiment, determination of whether or not the rendering object rendered in the selection block was rendered in the preceding frame screen is made.

The server CPU 201 moves the processing on to step S507 in a case where it determined that the preceding frame depth value and the evaluation depth value of the evaluation pixel in the preceding frame screen are considered to be the same, and moves the processing to step S508 in a case where it determines that they are not considered to be the same.

In step S507, the server CPU 201 updates the number of times that the preceding frame depth value and the evaluation depth value matched, which is stored in the server RAM 203.

In step S508, the server CPU 201 determines whether or not the number of evaluation pixels set for the selection block reaches a predetermined evaluation sample number. In a case where the server CPU 201 determines that the number of evaluation pixels set for the selection block reaches the predetermined evaluation sample number, it moves the processing on to step S509, and in a case that it determines that the number of evaluation pixels set for the selection block does not reach the predetermined evaluation sample number, it returns the processing to step S502.

In step S509, the server CPU 201 determines whether or not the number of times that the preceding frame depth value and the evaluation depth value matched stored in the server RAM 203 exceeds a threshold. In a case where the server CPU 201 determines that the number of times that the preceding frame depth value and the evaluation depth value matched exceeds the threshold, it moves the processing on to step S510 as there is no change to the occlusion status of the selection block. Also, in a case where the server CPU 201 determines that the number of times that the preceding frame depth value and the evaluation depth value matched does not exceed the threshold, it moves the processing to step S511.

In step S510, the server CPU 201 associates coding identification information indicating performance of inter-frame coding with the selection block. The coding identification information may be, for example, 1 bit boolean type information. Specifically, in the present embodiment, determination of whether to execute intraframe coding or inter-frame encoding for a selection block is made based on whether or not a rendering object included in the selection block is in an occlusion state in the preceding frame. In other words, in a case where the rendering object included in the selection block is not in an occlusion state in the preceding frame, a region having pattern (texture, etc.) with a high degree of similarity to the selection block exists in the preceding screen. For this reason, the server CPU 201 determines that performing inter-frame prediction will produce a higher compression rate, and so it generates coded moving image data by performing inter-frame coding.

In step S511, the server CPU 201 determines whether or not the processing of step S502 through S510 was executed for all of the blocks of the target game screen. In a case where the server CPU 201 determined that there still exist blocks for which the processing has yet to be executed, the processing returns to step S501, and in a case where it is determined that none exist, the present coding determination processing completes.

The server CPU 201 determines whether to perform intraframe coding or inter-frame coding for each block of the rendered game screen with the coding determination processing in this way.

In step S406, the server CPU 201 transmits coding identification information for each block of the rendered game screen, viewpoint information used in rendering of the game screen, and a depth buffer corresponding to the rendered game screen to the PC 100 as coding details information by transmitting to the server communication unit 208. The coding details information is used in later explained decoding preprocessing executed on the PC 100.

In step S407, the server CPU 201 generates coded moving image data by executing coding processing on the rendered game screen.

<Coding Processing>

Figure 7:
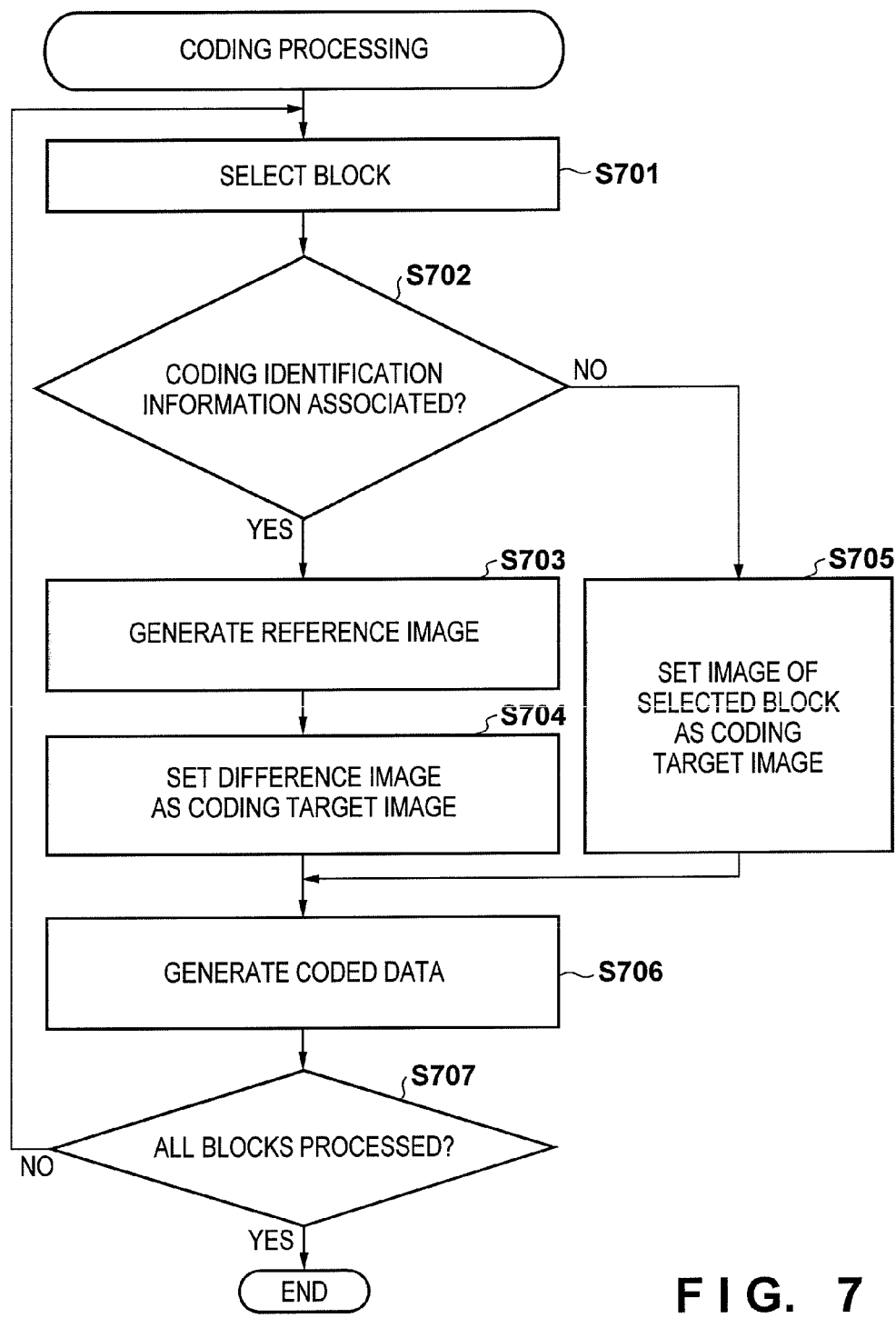
FIG. 7 is a flowchart illustrating coding processing of the moving image distribution server 200 according to the embodiment of the present invention.

Details of coding processing executed in the moving image distribution server 200 of the embodiment will be explained with reference to FIG. 7.

In step S701, the server CPU 201 selects an uncoded block out of the blocks of the rendered game screen.

In step S702, the server CPU 201 determines whether or not coding identification information is associated with the selection block. Specifically, the server CPU 201 determines from coding identification information whether to perform inter-frame coding for the selection block. In a case where the server CPU 201 determined that coding identification information is associated with the selection block, it moves the processing on to step S703, and in a case where it determines that coding identification information is not associated, it moves the processing on to step S705.

In step S703, the server CPU 201 generates a reference image (reference data) to be used for inter-frame coding from the image of the region, corresponding to the selected block, of the game screen (preceding frame screen) rendered in the frame immediately before the current frame. Specifically, the server CPU 201 first determines coordinates of the four corners of the corresponding region by converting the pixels of the four corners of the selection block to screen coordinates for the preceding screen by the same method as with the above described coding determination processing. Then, the server CPU 201 generates a reference image having the same number of pixels as the selection block by multiplying by a transformation matrix generated from, for example, viewpoint information used in rendering of game screens of the preceding frame and the current frame with an image of the corresponding region.

In step S704, the server CPU 201 generates the difference between the image of the selected block and the reference image as a difference image and sets it as a coding target image. More specifically, the server CPU 201 generates the difference image (pblock) by subtracting the pixel value of each pixel of the reference image from the pixel value of a corresponding pixel of the selected block.

On the other hand, in step S702, in a case where it determined that coding identification information is not associated with the selection block, the server CPU 201 sets the image of the selection block as the coding target image in step S705.

In step S706, the server CPU 201 transmits the coding target image to the server coding unit 206 and causes it to execute DCT processing to convert the image into data in the frequency domain. The server CPU 201 also causes the server coding unit 206 to perform run-length coding of the data in the frequency domain obtained by conversion, thereby generating the coded data of the selected block.

In step S707, the server CPU 201 determines whether all blocks of the rendered game screen have performed the processing of step S702 to S706. Upon determining that an unprocessed block exists, the server CPU 201 returns the process to step S701. Upon determining that no unprocessed block exists, the server CPU 201 terminates the coding processing.

The server CPU 201 generates coded moving image data from the rendered game screen in this way. Note, it is not necessary that the coded moving image data generated with the coding processing of the present embodiment include a motion vector for a block for which inter-frame coding is performed. In other words, because on the moving image distribution server 200 of the present embodiment determination of the region is performed using viewpoint information used in rendering of the screen and the depth buffer without performing a search, or the like, for a region having a highest correlation with the block image, a motion vector is not included in the coded motion image data. Also, in step S406, because information necessary for determining a region with the highest correlation is transmitted to the PC 100 as coded detail information, generation of a reference image necessary when decoding may be performed in the same way on the PC 100, and so it is not necessary to use motion vectors.

In step S408, the server CPU 201 transmits the coded moving image data generated in step S407 to the server communication unit 208, and terminates the moving image distribution processing of the current frame.

<Moving Image Reproduction Processing>

Details of moving image reproduction processing to be executed by the PC 100 of the embodiment will be described with reference to the flowchart of FIG. 8. Processing corresponding to the flowchart can be implemented by causing the CPU 101 to read out a corresponding processing program recorded in, for example, the ROM 102 and extract and execute it on the RAM 103. Note that the description will be made assuming that the moving image reproduction processing is started when, for example, an application for receiving a game content provided by the moving image distribution server 200 is executed on the PC 100, and repetitively executed for each frame of the game.

In step S801, the CPU 101 determines whether or not the communication unit 105 received coding details information from the moving image distribution server 200. In a case where the CPU 101 determines that coding details information was received from the moving image distribution server 200, it moves the processing on to step S802, and in a case where it determines that coding details information was not received, processing of this step is repeated.

In step S802, the CPU 101 executes decoding pre-processing to prepare reference data necessary for decoding a game screen of the current frame referencing the coding details information.

(Decoding Preprocessing)

Figure 9:
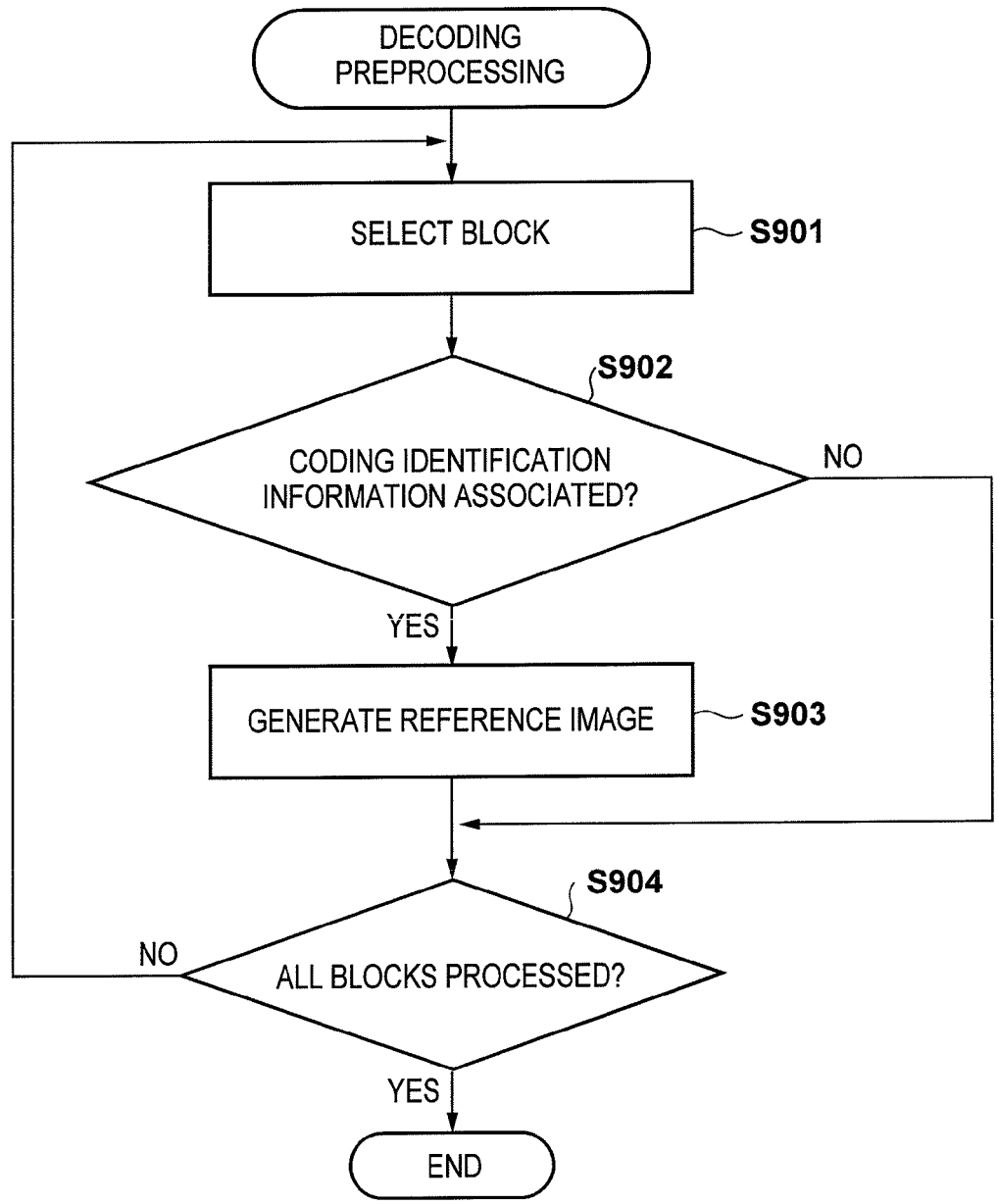
FIG. 9 is a flowchart illustrating decoding preprocessing of the PC 100 according to the embodiment of the present invention.

Details of decoding preprocessing to be executed by the PC 100 of the embodiment will be described with reference to the flowchart of FIG. 9.

In step S901, the CPU 101 selects, out of the blocks of the game screen received in the current frame, a block that has not performed coding type determination used.

In step S902, the CPU 101, referencing the coding details information, determines whether or not coding identification information indicating that the selection block is to be inter-frame coded is associated. In a case where the CPU 101 determined that coding identification information indicating is associated, it moves the processing to step S903, and in a case where it determines that coding identification information indicating is not associated, it moves the processing on to step S904.

In step S903, the CPU 101 generates a reference image (reference data) to be used in decoding of the selection block from the image of the region corresponding to the selection block in the game screen (preceding frame screen) decoded for 1 frame immediately before the current frame. The PC 100 of the present embodiment maintains in the RAM 103 the preceding frame screen decoded on the frame immediately before the current frame, viewpoint information used in rendering of the preceding frame screen, and a depth buffer corresponding to the preceding frame screen in the same way as the moving image distribution server 200. The CPU 101 generates a reference image having the same number of pixels as the selection block using the same method as the coding processing of the above described moving image distribution server 200.

In step S904, the CPU 101 determines whether all blocks of the game screen received in the current frame have performed the processing of steps S902 and S903. Upon determining that an unprocessed block exists, the CPU 101 returns the process to step S901. Upon determining that no unprocessed block exists, the CPU 101 terminates the decoding preprocessing.

As described above, before decoding processing to be executed after reception of coded moving image data, the PC 100 of this embodiment can prepare reference data to be used in decoding processing by referring to coding details information received before coded moving image data.

In step S803, the CPU 101 determines whether the communication unit 105 has received coded moving image data from the moving image distribution server 200. Upon determining that coded moving image data has been received from the moving image distribution server 200, the CPU 101 advances the process to step S804. Upon determining that no data has been received, the processing of step S803 is repeated.

In step S804, the CPU 101 transmits the received coded moving image data to the decoding unit 104 and causes it to execute decoding processing to generate the game screen. More specifically, the decoding unit 104 performs decoding of the run-length-coded data string and inverse DCT processing for each block of the coded moving image data, thereby generating the block data of the game screen of the current frame. For a block that has performed inter-frame coding, the decoding unit 104 adds the reference data generated by the above-described decoding preprocessing, thereby generating the game screen of the current frame.

In step S805, the CPU 101 transmits the game screen of the current frame generated in step S804 to the display unit 106, causes it to display the game screen in a corresponding display region, and terminates the moving image reproduction processing of the current frame.

As described above, the moving image distribution server 200 in the moving image distribution system of this embodiment can transmit coding method information to the PC 100 before coded moving image data is generated and distributed. More specifically, since a reference image can be prepared by preprocessing before reception of the coded moving image data, the time of decoding processing executed after reception of the coded moving image data can be shortened. That is, the moving image distribution method of this embodiment can shorten the time needed until reproduction of a decoded moving image as compared to a conventional method in which a reference image to be used for decoding a block that has performed inter-frame coding is generated from the preceding frame image by referring to a motion vector contained in received coded moving image data.

Also, the moving image distribution server 200 of the present embodiment does not require the calculation of the level of similarity performed in order to search the game screen of the preceding frame for the most highly correlated region for a block for which inter-frame coding is performed. For example, in a case where Euclidean distance calculation is performed as a calculation of a degree of similarity between images, a position where the distance is smallest is determined by shifting an image set as a base image with respect to a target image by a single pixel or by a half pixel. Thus, the amount of calculation increases in accordance with the number of times the base image is moved within the search scope. On the other hand, the moving image distribution server 200 of the present embodiment can determine the region with the highest correlation, and estimate the degree of correlation by referencing viewpoint information used in rendering of the screen and the depth buffer generated along with the frame screen. Specifically, because it is possible to determine the region that becomes the reference image with a simple calculation using a coordinate transform matrix, it is possible to reduce the amount of calculation more than the method used in the conventional method, and as a result the amount of time required for the coding processing can be reduced. Note, the transform matrix used in the transform into screen coordinates for the two frames can be reused for all of the blocks in the frame since it is calculated from viewpoint information used in rendering of each of the 2 frames.

Note, the reference image referenced in the inter-frame coding and corresponding decoding of the present embodiment was explained as something generated from the screen rendered for a frame immediately before the current frame, but working of the present invention is not limited to this. Generation of the reference image may be based on a screen rendered prior to the current frame.

Also, in the present embodiment, for simplicity explanation was made having rendering objects included in the rendering scope be non-moving, static objects, but working of the present invention is not limited to this. Because depth value comparison is performed, the rendering objects being static objects is advantageous, but if the comparison is within 1 frame, it can be considered that the change of each rendering object is small. For this reason, if the evaluation depth value and the preceding frame depth value are in a range in which they can be considered to be the same, it is possible to apply the present invention. In this case, determination of whether or not to perform comparison of depth values may be performed considering an amount of movement from the preceding frame of the rendering object rendered on the evaluation pixel. Specifically, in a case where the movement amount of the rendering object is greater than or equal to a threshold, performance of inter-frame coding may be determined without comparing depth values.

Also, explanation was given having, acquired coding details information be transmitted to the PC 100 after coding determination processing was performed for all of the blocks of the screen of the current frame in the above described moving image distribution processing, but it is easy to see that the timing of transmitting the coding details information is not limited to this. Specifically, the server CPU 201 may transmit coding details information of a block to the PC 100 without waiting to acquire determination results for all of the blocks in a case where a determination result of whether or not to perform inter-frame coding for block is acquired.

As explained above, the moving image distribution server of the present embodiment can quickly and efficiently perform moving image coding of screens acquired with rendering processing. Specifically, the moving image distribution server acquires in series a rendered screen, viewpoint information used for rendering the screen, and a depth buffer corresponding to the screen. It sets a evaluation pixel for each of the blocks that it divided a first screen into, and specifies a screen coordinate and a depth value, in a second screen acquired before the first screen, for a rendering object rendered on the evaluation pixel. Also, it compares a depth value of the screen coordinate and the depth value of the rendering object rendered on the evaluation pixel, and determines that inter-frame coding will be performed with the second screen for a block for which the 2 depth values are considered to be the same. Then, it transmits, to a external device, coding details information including the viewpoint information used for rendering of the first screen, the depth buffer corresponding to the first screen, and information indicating whether or not blocks of the first screen are to be inter-frame coded.

By doing this, it is possible to reduce the amount of calculation related to inter-frame coding processing, and it is possible to prepare reference data used in decoding on the external apparatus before the receipt of the coded moving image data. For this reason, in a case where a moving image distribution server distributes moving image content that changes in accordance with user input in a moving image playback apparatus, it is possible to provide to the user moving image content that has high responsiveness to user input.

[Variation]

The above described embodiment was explained having a depth buffer being acquired along with the rendering of frame screens, but working of the invention can particularly improve efficiency by a method of rendering screens.

In a conventional rendering method, each rendering object included in a game screen is sequentially selected and rendered by performing the following processing:

1. movement/rotation processing by a vertex shader;
2. vertex processing by a geometry shader; and
3. effect processing including pixel-basis shadow processing by a pixel shader.

That is, the conventional rendering method is so-called Forward Rendering method performing a procedure "shadow processing→rendering" for each rendering object. In Forward Rendering, objects are sequentially processed. Hence, the rendered contents of one object may be overwritten by those of another object located closer to the camera (located nearer than the object of interest) depending on the pixels. In this case, the shadow processing is wastefully applied for a partial region of the object rendered first, which is occluded by the object rendered later. In addition, for example, a light source existing in a rendered scene is common to all objects existing in the scene. In Forward Rendering, however, it is difficult to reuse common calculation contents for rendering one object to render another object. For these reasons, the Forward Rendering is not efficient in game screen rendering with particularly complex shadow processing.

On the other hand, in Deferred Rendering, geometry to be used for shadow processing is calculated first, and shadow processing of all rendering objects is performed later at once, unlike the Forward Rendering. That is, the rendering processing is executed in two steps including a procedure "geometry rendering→shadow processing→rendering". In the Deferred Rendering, the geometry is rendered together with parameters to be used for shadow processing without lighting in rendering of the preceding stage, thereby generating a plurality of intermediate value maps (Albedo map, Depth map, Normal map, Specular map, Diffuse map, and the like) representing the intermediate values to be used for the shadow processing. In rendering of the subsequent stage, a screen is rendered by performing shadow processing using a light source while applying the plurality of generated intermediate value maps.

In this way, in a case where in the moving image distribution server 200 a game screen of a frame is rendered by the Deferred Rendering, a depth buffer (depth map) is generated in preceding stage rendering before the game screen is finally acquired. Specifically, because it is possible to execute the above described coding determination processing before the final rendering of the game screen, the moving image distribution server 200 can transmit the coding details information to the PC 100 at a stage earlier than in the above described embodiment. Also, because it is possible to move on to preparation of the reference image during second pass rendering for a block for which inter-frame coding execution was determined with the coding determination processing, it is possible to reduce the time from when the game screen is finally generated to the time when the coding processing completes.

Embodiment 2

In the above described embodiment and variation, explanation was given of a method for quickly and efficiently motion image coding game screens by determining which of inter-frame coding and intraframe coding to use for coding processing of a game screen using a depth buffer generated in the rendering of a different frame. In the present embodiment, explanation of a method of fast moving image coding of a game screen and efficient distribution of moving image coded data for a case where a plurality of PCs 100 which are moving image playback apparatuses are connected to the moving image distribution server 200.

<Moving Image Distribution System Arrangement>

Figure 10:
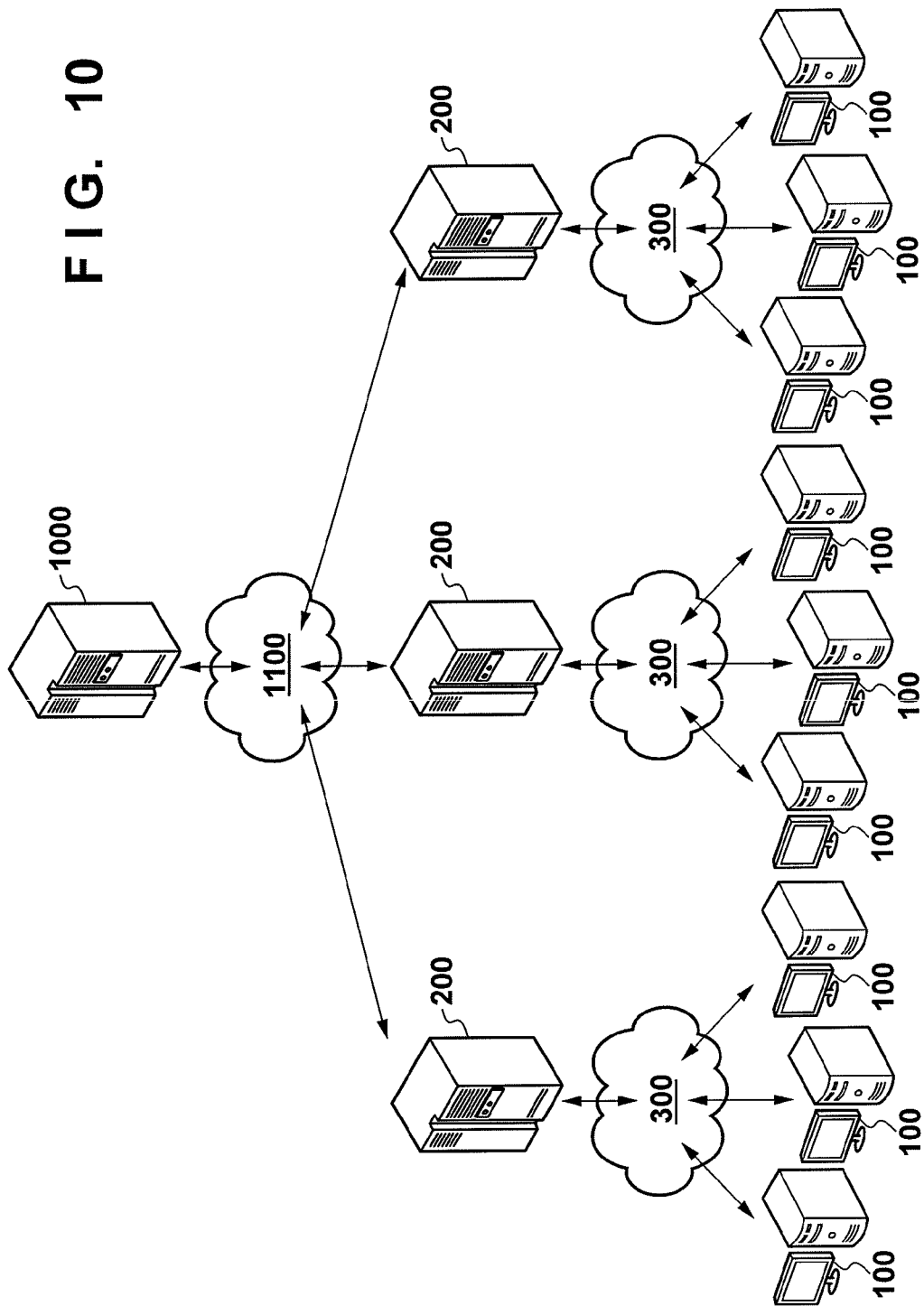
FIG. 10 is a view showing the system arrangement of a moving image distribution system according to the second embodiment of the present invention.

FIG. 10 is a view showing the system arrangement of a moving image distribution system according to the present embodiment. Note, in the explanation of the present embodiment, arrangements and apparatuses common to the above described first embodiment will be given common reference numerals, and explanation will be omitted.

As shown in the drawing, a plurality of PCs 100 are connected via a network 300 to the moving image distribution server 200 of the present embodiment. In the present embodiment, the moving image distribution server 200 receives operations performed on the PCs 100 and renders game screens corresponding to these operations for each frame. At this time, the moving image distribution server 200 executes rendering processing of a game screen to be provided to a PC 100 and screen coding processing in parallel. Also, the moving image distribution server 200 distributes coded moving image data to each PC 100 in parallel.

Also, in the moving image distribution system of the present embodiment, the moving image distribution server 200 is connected via a network 1100 to a central server 1000. In general, in an online game service, the moving image distribution server 200 for service providing is arranged in a plurality of locations in order to disperse the load of the service. In the present embodiment, the central server 1000 performs integrated management of the plurality of moving image distribution servers 200 dispersedly arranged in the plurality of locations in this way. The central server 1000 collects moving image distribution condition information from each moving image distribution server 200 and performs determination processing, and by indicating to the moving image distribution servers 200 appropriate parameters that enable efficient moving image distribution, realizes efficient moving image distribution.

Note, in the present embodiment, the moving image distribution server 200 and the central server 1000 are connected via the network 1100, but working of the present invention is not limited to this, and design may be made so that the central server 1000 is connected to the moving image distribution servers 200 via the network 300 in the same way as the PCs 100. Also, explanation is made envisioning the actual embodiment, and in the present embodiment the central server 1000 performs integrated management of the moving image distribution servers 200 which are dispersedly arranged at a plurality of locations, but working of the present invention is not limited to this. The plurality of moving image distribution servers 200 may exist independently at the same location, and design may be made so that the central server 1000 performs integrated management of these. In this case, the moving image distribution servers 200 and the central server 1000 may be directly connected to each other by cables and not connected via the network 1100.

In the moving image distribution system of this kind of embodiment, capability of processing in parallel the distribution to the plurality of connected PCs 100 of coded moving image data is requested of the moving image distribution server 200. However, in a case, as with an online game service, of a service in which the client number connected to the moving image distribution server 200 changes with time, performance design of the moving image distribution server 200 is difficult. For example, in a case where performance design was made based on service provision for a peak time slot for traffic of connected clients, an infrastructure performance surplus will occur at time slots other than the peak time slot. With such a performance design, the cost of introducing the moving image distribution servers 200 will increase unnecessarily. Also, in a case where performance design is made based on service provision for a time slot other than the peak time slot, for example, because service provision to an number of clients exceeding an allowable number of clients will not be possible, it will be necessary to increase the number of the image distribution servers 200, and as a result, the cost of their introduction will be incurred unnecessarily.

In the moving image distribution system of the present embodiment, for a case where performance design of the moving image distribution servers 200 in this kind of moving image distribution service is made based on a time slot other than the peak time slot, a method of fast moving image coding and efficient distribution of moving image coded data and of efficient load dispersion is proposed.

<Arrangement of the Central Server 1000>

Figure 11:
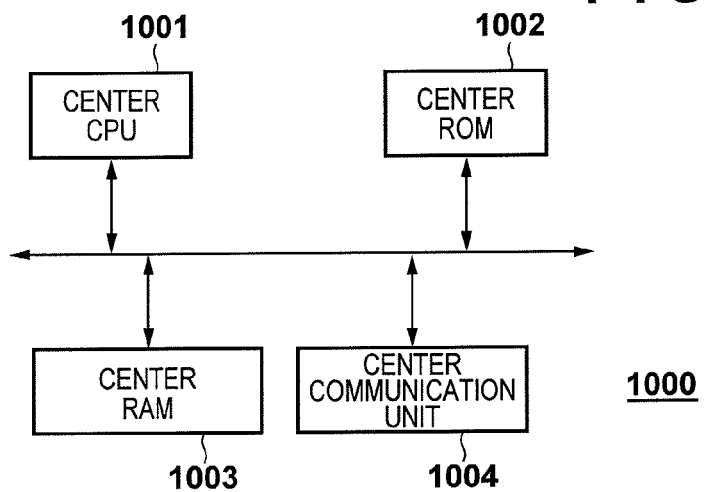
FIG. 11 is a block diagram showing the functional arrangement of a central server 1000 according to the second embodiment of the present invention.

FIG. 11 is a block diagram showing the functional arrangement of a central server 1000 according to the second embodiment of the present invention.

A central CPU 1001 controls operation of each block of the central server 1000. Specifically, the central CPU 1001 controls the operation of each block is by reading out an operation program of each block stored in a central ROM 1002, for example, loading into a central RAM 1003, and executing.

The central ROM 1002 is, for example, a re-writeable non-volatile memory. The central ROM 1002, in addition to operation programs of each block of the central server 1000 stores information of constants and the like necessary in the operation of each block.

The central RAM 1003 is a volatile memory. The central RAM 1003 is used not only as a loading area for operation programs but also as a storage area for temporarily storing intermediate data output in the operation of each block of the central server 1000. In the present embodiment, information indicating a moving image distribution condition for the moving image distribution servers 200 connected to the central server 1000 is stored in the central RAM 1003.

A central communication unit 1004 is a communication interface of the central server 1000. In the present embodiment, the central communication unit 1004 receives information indicating a moving image distribution condition according to moving image distribution processing performed on the moving image distribution servers 200 from the moving image distribution servers 200 connected via the network 1100. Also, the central communication unit 1004 transmits to each moving image distribution server 200 parameters concerning quality adjustments of coded moving image data, provided to the moving image distribution servers 200 in the moving image distribution processing, which acquire a result of determination processing of the moving image distribution condition in the central server 1000.

<Information Collection Processing>

Figure 12:
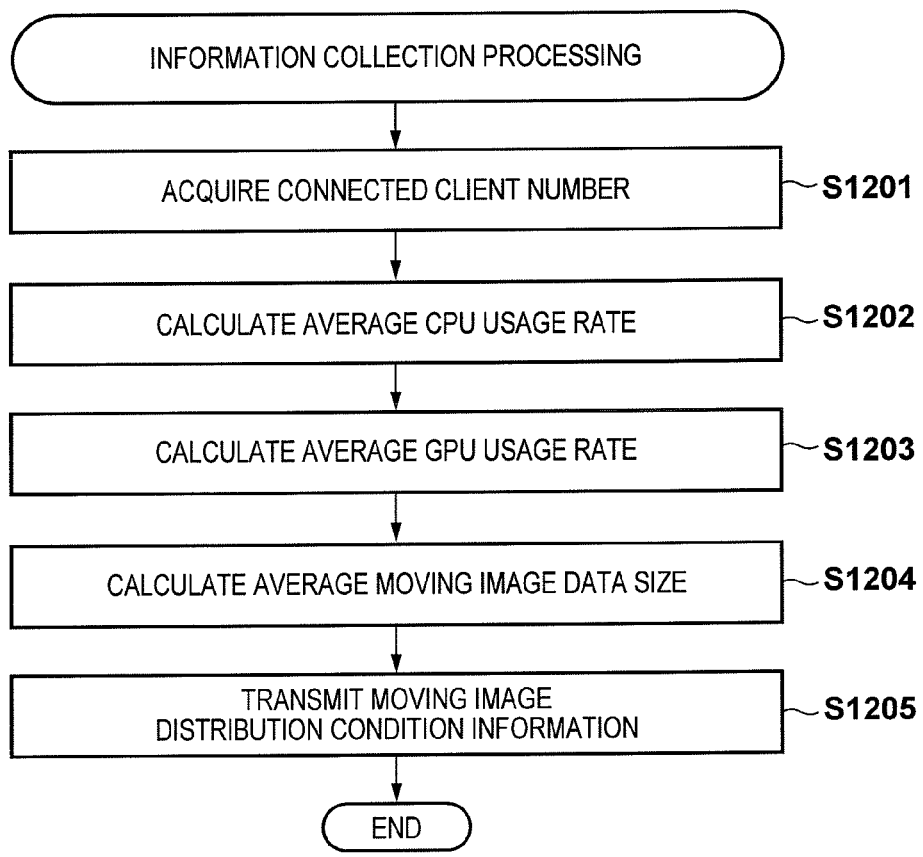
FIG. 12 is a flowchart illustrating information gathering processing of the moving image distribution server 200 according to the second embodiment of the present invention.

Firstly, the detailed processing of information collection processing in which information indicating a moving image distribution condition concerning moving image distribution processing is collected which is executed on the moving image distribution server 200 will be explained with reference to the flowchart of FIG. 12. Processing corresponding to this flowchart can be realized by the server CPU 201 reading out a corresponding processing program stored in the server ROM 202, for example, loading into the server RAM 203 and executing. Note this information collection processing will be explained having the moving image distribution server 200 execute it periodically at predetermined intervals between moving image distribution to the PCs 100 being performed.

In step S1201, the server CPU 201 acquires the number of clients currently connected to the moving image distribution server 200. The number of clients currently connected may be managed by having information of a connection number that is stored in the server RAM 203 updated when the server communication unit 208 receives a connection request from a PC 100.

In step S1202, the server CPU 201 calculates an average CPU usage rate being used for a single client on moving image distribution. Specifically, the server CPU 201 calculates an average CPU usage rate by dividing the current total CPU usage rate by the number of clients acquired in step S1201. Note, the CPU usage rate is assumed to indicate what percentage of the resource out of the resource that the CPU is capable of providing is being used for a single client.

In step S1203, the server CPU 201 calculates in the same way the average GPU usage rate for a single client on moving image distribution. Note, the GPU usage rate is assumed to indicate what percentage of the resource out of the resource that the GPU is capable of providing is being used for a single client.

In step S1204, the server CPU 201 calculates the average moving image data size of coded image data transmitted to a single client on moving image distribution. In the moving image distribution system of the present embodiment, it is conceived that coded image data will be viewed at various display resolutions on each PC 100. Specifically, a user or an application on the PC 100 will select the resolution of coded moving image data at which to receive the provision according to the capabilities of the PC 100 and preference out of 480p, 720p, 1080p, etcetera, and receive the corresponding coded image data from the moving image distribution server 200. Also, because coding efficiency changes based on the scene being rendered, regarding the data size of the coded moving image data provided, provided that the bit rate is not held constant, various data sizes are possible. Because it is conceived that the data sizes of coded moving image data transmitted to the PCs 100 will differ in this way, in this step the server CPU 201 calculates the average moving image data size. Note, in the present embodiment, coded moving image data provided to the PCs 100 is explained as something as for which display resolution and data size differ and as something whose average moving image data size is calculated, but the processing of the present step may not be performed in a case where it is ensured that they are static.

In step S1205, the server CPU 201 transmits the average moving image data size, the average GPU usage rate and the average CPU usage rate calculated in the processing of step S1202 through S1204 as moving image distribution condition information to the central server 1000 via the server communication unit 208, and this information collection processing completes.

<Determination Processing>

Figure 13:
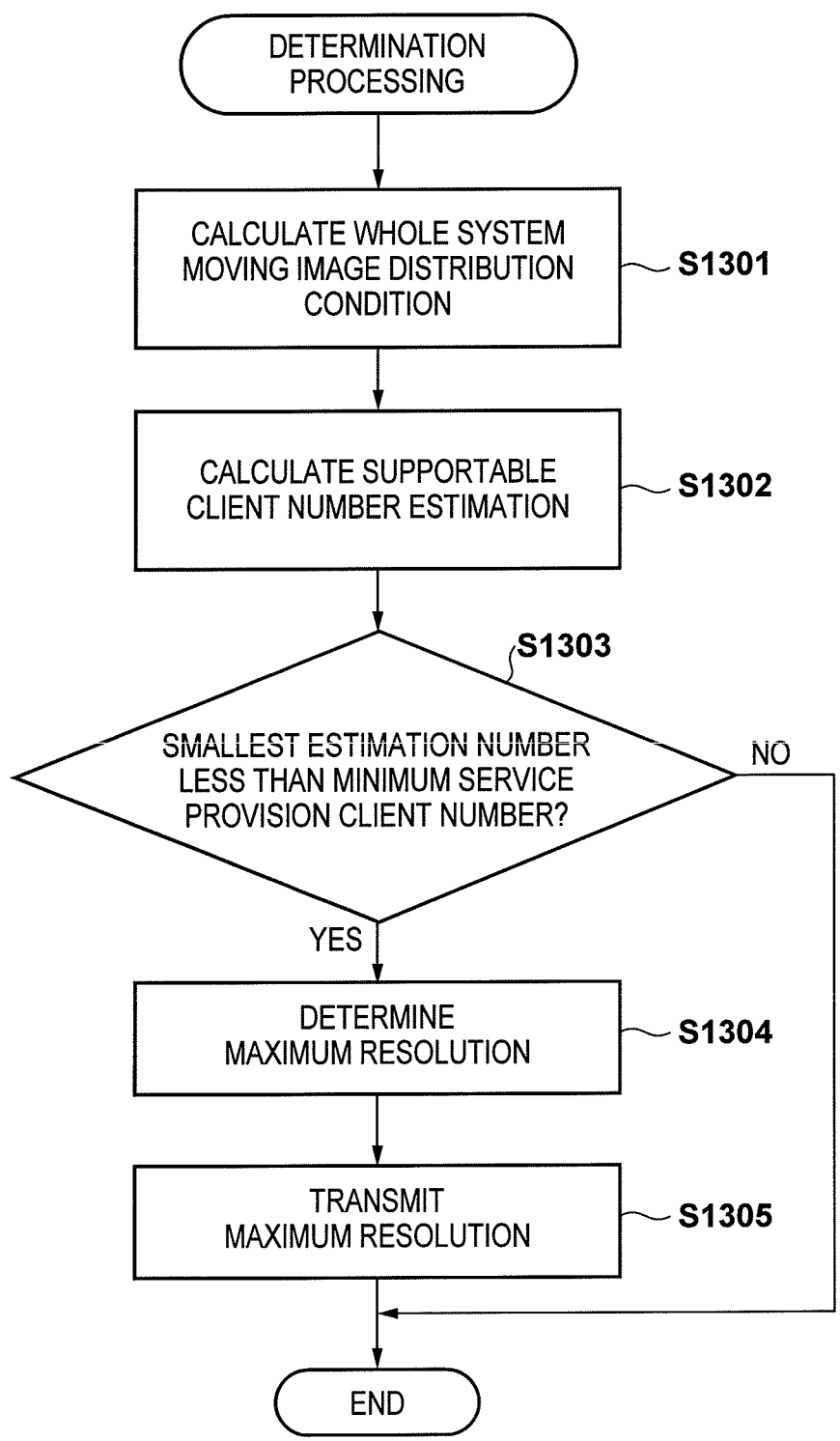
FIG. 13 is a flowchart determination processing of the central server 1000 according to the second embodiment of the present invention.

The detailed processing of determination processing executed on the central server 1000, the server having acquired moving image distribution condition information acquired by the information collection processing executed in this way on the moving image distribution server 200, will be explained with reference to the flowchart of FIG. 13. Processing corresponding to this flowchart can be realized by the central CPU 1001 reading out a corresponding processing program stored in the central ROM 1002, for example, loading into the central RAM 1003 and executing. Note this determination processing will be explained being, executed periodically as predetermined time intervals, and as an example, when moving image distribution condition information is received from each moving image distribution server 200.

Also, in the following explanation, moving image distribution condition information of each moving image distribution server 200 received in the central server 1000 is stored in the central RAM 1003 by the central CPU 1001.

In step S1301, the central CPU 1001 calculates an average CPU usage rate, an average GPU usage rate, and an average moving image data size for the system on the whole referring to moving image distribution condition information received from each moving image distribution server 200 connected to the central server 1000. Specifically, the central CPU 1001 determines a distribution condition for the system on the whole by calculating average values for the each information item received from all of the moving image distribution server 200.

In step S1302, the central CPU 1001 calculates a prediction value of a number of clients that the system on the whole can support based on moving image distribution condition information for the system as a whole. In the central server 1000 of the present embodiment, it calculates the prediction value of the number of clients that the system on the whole can support using the following 3 formulas.

$$\text{number of CPU per server} \times \text{number of moving image distribution servers 200/average CPU usage rate} \quad 1.$$

$$\text{number of GPU per server} \times \text{number of moving image distribution servers 200/average GPU usage rate} \quad 2.$$

$$\text{maximum transmittable data size of the network 300/average moving image data size} \quad 3.$$

The central CPU 1001 stores the estimation values acquired from the above described 3 formulas in the central RAM 1003 as estimated value 1, estimated value 2 and estimated value 3.

In step S1303, the central CPU 1001 determines whether or not the estimation value which the least number of clients out of the estimation value calculated in step S1302 is smaller than a predetermined number of clients Z which is a client number for minimum service provision. In a case where the central CPU 1001 determines that the estimation value is less than the number of clients Z for which minimum service provision is performed, it moves the processing on to step S1304, and in the case where it is not less, it terminates this determination processing.

In step S1304, the central CPU 1001 determines a maximum resolution of coding data to be provided from each moving image distribution server 200 to the PCs 100 so that the solution to the calculation that calculated the lowest estimation value of the number of clients is larger than the number of clients Z for which minimum service provision is performed. The maximum resolution of the coding data is made to be something for which the resolutions for which provision is possible are determined in advance as described above. In the present step, the central CPU 1001 selects one resolution out of these as the maximum resolution of provided coded moving image data.

Note, information of average moving image data size, GPU usage, and CPU usage that is reduced by changing the maximum resolution of the coded moving image data that is provided may be, for example, acquired in advance, and stored in the central ROM 1002 or the like as a table. Then, the central CPU 1001 may determine the maximum resolution that satisfies the condition by referring to this table. Also, even if it is not pre-stored as a table, information of the resolution of the coded data provided to the PCs 100 from each separate moving image distribution server 200 may be acquired and an appropriate maximum resolution may be determined based on this information.

In step S1305, the central CPU 1001 transmits information of the determined maximum resolution of the coded moving image data via the central communication unit 1004 to each moving image distribution server 200, and terminates this determination processing.

In this way, in the moving image distribution system of the present embodiment, the central CPU 1001 determines the maximum resolution of coded moving image data in the moving video distribution considering a moving image distribution condition in each moving image distribution server 200 and notifies each moving image distribution server 200. With this, in the system on the whole, even in a case where a number of clients exceeding the performance design has connected to the moving image distribution servers 200, it is possible to perform provision of the server in a state in which a minimum service quality is maintained by decreasing the resolution of the coded moving image data that is distributed.

Note, in the present embodiment, explanation was given having the central CPU 1001 determine the maximum resolution of coded moving image data to be provided in order to guarantee a minimum service quality for the system on the whole, but performing workload balance adjustment so that for a moving image distribution server 200 that cannot provide the service to the connected PC 100s within resources even having set this maximum resolution at this time, some of the clients connected to this server connect to another moving image distribution server 200 on the network with few connections.

<Moving Image Distribution Processing>

Below, explanation of specific processing for a moving image distribution system executed in the moving image distribution server 200 of the moving image distribution system of the present embodiment will be given using the flowchart of FIG. 14. Note, for the moving image processing of the first embodiment and the steps for performing similar processing in this moving image distribution processing, common reference numerals are assigned and explanation is omitted, and only the characteristic processing of the present embodiment will be explained below.

In step S1401, the server CPU 201 determines whether or not the maximum resolution of the coded moving image data is set. Specifically, the server CPU 201 performs the determination of this step based on whether or not information of the maximum resolution of coded moving image data received from the central server 1000 is stored in the server RAM 203. In a case where the server CPU 201 determined that the maximum resolution of the coded moving image data was set, it moves the processing on to step S1402, and in a case where it is not set, it moves the processing on to step S401.

In step S1402, the sever CPU 201 determines whether or not provision of coded moving image data is being requested for a resolution larger than the maximum resolution from the PC 100, which is a game screen destination. In a case where the server CPU 201 determined that the requested coded moving image data resolution is larger than the maximum resolution, it moves the processing on to step S403, and in a case where it determined that is less than the maximum resolution, it moves the processing on to step S401.

In step S1403, the server CPU 201 sets the maximum resolution provided by the central server 1000 of game screens rendered in step S402 and moves the processing on to step S401.

By doing this, it is possible to set the maximum resolution of game screens rendered in the moving image distribution processing. Also, because by the maximum resolution of game screen being set in this way, the maximum resolution of the resolution of the depth buffer generated simultaneously is defined, it is possible to reduce the processing amount in the above described coding determination processing.

As explained above, in the moving image distribution system of the present embodiment, it is possible to perform fast moving image coding of game screens and distribute moving image coding data efficiently according to the number of clients connected to the system and moving image distribution conditions. Note, in the present embodiment, explanation was given having the central server 1000 set the maximum resolution of the coded moving image data to be distributed considering a moving image distribution condition of the system on the whole, but working of the present invention is not limited to this, and the above described determination processing may, for example, be performed by each moving image distribution server 200. In other words, the system on the whole is not considered, and each moving image distribution server 200 may perform determination processing considering a moving image distribution condition for connected clients, and perform moving image distribution while dynamically changing the maximum resolution in the moving image distribution.

The present invention is not limited to the above described embodiments, and various changes and variations are possible without deviating from the essence and the scope of the present invention. Accordingly, the following claims are attached in order to make public the scope of the present invention.

What is claimed is:

1. A non-transitory computer-readable recording medium storing a program for causing a computer to execute the following processing:

processing for obtaining, for a target frame which is a target of encoding and a reference frame which is referred to for the encoding of the target frame, viewpoint information used for rendering each of the target frame and the reference frame and a depth buffer generated when rendering an image corresponding to each of the target frame and the reference frame;

processing for specifying, for an evaluation pixel in a region defined in the depth buffer of the target frame, a position of a corresponding pixel which corresponds to the evaluation pixel in the depth buffer of the reference frame and an estimated depth value of the corresponding pixel, based on the viewpoint information obtained for the target frame and the reference frame and the depth buffer of the target frame; and processing for deciding an encoding method to be used for a target block of the target frame corresponding to the region including the evaluation pixel based on the estimated depth value and a depth value of the corresponding pixel in the depth buffer of the reference frame, wherein a plurality of the evaluation pixel is set for the region, and in the processing for deciding:

in a case where a number of the plurality of the evaluation pixel for which the estimated depth value and the depth value of the corresponding pixel in the depth buffer of the reference frame are the same does not exceed a threshold value, a first encoding method which uses only the target frame is decided as the encoding method to be used for the target block; and in a case where the number of the plurality of the evaluation pixel for which the estimated depth value and the depth value of the corresponding pixel in the depth buffer of the reference frame are the same is more than the threshold value, a second encoding method which uses the target frame and the reference frame is decided as the encoding method to be used for the target block.

2. The non-transitory computer readable recoding medium according to claim 1, wherein the region has a rectangular shape, and the second encoding method uses an image having same pixels as the target block as a reference image, where the image having the same pixels is generated from an image of the reference frame based on positions of pixels corresponding to vertexes of the region having the rectangular shape.

3. The non-transitory computer readable recoding medium according to claim 1,
wherein the program further causes the computer to execute processing for transmitting information indicating the encoding method for the target block to an encoder and a decoder, the encoder being configured to encode the target frame based on the encoding method, the decoder being configured to obtain the target frame encoded by the encoder and to decode the target frame.

4. The non-transitory computer readable recoding medium according to claim 3, wherein, in the processing for transmitting, the viewpoint information and the depth buffer of the target frame are output in addition to the information indicating the encoding method.

5. The non-transitory computer readable recoding medium according to claim 3, wherein the information is transmit to the decoder and encoding processing for the target frame by the encoder are performed without waiting to acquire determination results for all blocks of the target frame.

6. A method for deciding an encoding method, the method comprising:
obtaining, for a target frame which is a target of encoding and a reference frame which is referred to for the encoding of the target frame, viewpoint information used for rendering each of the target frame and the reference frame and a depth buffer generated when rendering an image corresponding to each of the target frame and the reference frame;
specifying, for an evaluation pixel in a region defined in the depth buffer of the target frame, a position of a corresponding pixel which corresponds to the evaluation pixel in the depth buffer of the reference frame and an estimated depth value of the corresponding pixel, based on the viewpoint information obtained for the target frame and the reference frame and the depth buffer of the target frame; and
deciding, by a processor, an encoding method to be used for a target block of the target frame corresponding to the region including the evaluation pixel based on the estimated depth value and a depth value of the corresponding pixel in the depth buffer of the reference frame,
wherein a plurality of the evaluation pixel is set for the region, and
in the deciding:
in a case where a number of the plurality of the evaluation pixel for which the estimated depth value and the depth value of the corresponding pixel in the depth buffer of the reference frame are the same does not exceed a threshold value, a first encoding method which uses only the target frame is decided as the encoding method to be used for the target block; and
in a case where the number of the plurality of the evaluation pixel for which the estimated depth value and the depth value of the corresponding pixel in the depth buffer of the reference frame are the same is more than the threshold value, a second encoding method which uses the target frame and the reference frame is decided as the encoding method to be used for the target block.

* * * * *